US012620873B2

(12) United States Patent
Matsuzaki et al.

(10) Patent No.: US 12,620,873 B2
(45) Date of Patent: May 5, 2026

(54) DRIVE DEVICE

(71) Applicant: NIDEC CORPORATION, Kyoto (JP)

(72) Inventors: Ryosuke Matsuzaki, Kyoto (JP); Taishi Satoda, Kyoto (JP); Sota Doi, Kyoto (JP); Jinnosuke Ikushima, Kyoto (JP); Daichi Sukemori, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 232 days.

(21) Appl. No.: 18/622,611

(22) Filed: Mar. 29, 2024

(65) Prior Publication Data

US 2024/0333100 A1 Oct. 3, 2024

(30) Foreign Application Priority Data

Mar. 31, 2023 (JP) ................................. 2023-058151
Jan. 31, 2024 (JP) ................................. 2024-013441

(51) Int. Cl.
| | |
|---|---|
| *H02K 9/19* | (2006.01) |
| *H02K 5/16* | (2006.01) |
| *H02K 7/08* | (2006.01) |
| *H02K 7/116* | (2006.01) |
| *B60K 1/00* | (2006.01) |

(52) U.S. Cl.
CPC ............... *H02K 9/19* (2013.01); *H02K 5/161* (2013.01); *H02K 7/083* (2013.01); *H02K 7/116* (2013.01); *B60K 1/00* (2013.01)

(58) Field of Classification Search
CPC .......... H02K 9/19; H02K 5/161; H02K 7/083; H02K 7/116; B60K 1/00
See application file for complete search history.

(56) References Cited

U.S. PATENT DOCUMENTS

2022/0094250 A1* 3/2022 Makino ................ H02K 11/225

FOREIGN PATENT DOCUMENTS

| JP | 6295240 B2 | 3/2018 |
|---|---|---|
| JP | 2019-106776 A | 6/2019 |

* cited by examiner

*Primary Examiner* — Viet P Nguyen
(74) *Attorney, Agent, or Firm* — HAUPTMAN HAM, LLP

(57) ABSTRACT

A drive device includes a motor, a transmission, a housing, and a flow path. The transmission includes first to third shafts, and first to third bearings supporting the first to third shafts, respectively. The housing includes a side wall covering a gear chamber from one side in an axial direction, and having first to third bearing holding portions for holding the first to third bearings, respectively. The flow path includes a supply flow path portion that supplies a fluid to the inside of the second bearing holding portion, a first flow path portion that connects the inside of the second bearing holding portion and the inside of the first bearing holding portion, and a second flow path portion that connects the inside of the second bearing holding portion and the inside of the third bearing holding portion.

12 Claims, 12 Drawing Sheets

DRIVE DEVICE

CROSS-REFERENCE TO RELATED APPLICATIONS

The present invention claims priority under 35 U.S.C. § 119 to Japanese Patent Application No. 2023-058151 filed on Mar. 31, 2023 and Japanese Patent Application No. 2024-013441 filed on Jan. 31, 2024, the entire contents of which are incorporated herein by reference.

FIELD OF THE INVENTION

The present invention relates to a drive device.

BACKGROUND

A drive device is mounted on a vehicle such as an electric vehicle and a hybrid vehicle. A fluid such as oil is stored in such a drive device, and the fluid lubricates gears and bearings in the drive device.

The bearing is held by a bearing holding portion provided in the housing. When a plurality of bearings are provided, it is required to stably supply fluid to each bearing and to suppress shortage of supply to some of the bearings.

SUMMARY

A drive device according to an embodiment of the present invention includes a motor, a transmission mechanism configured to transmit power of the motor, a housing provided with a gear chamber that accommodates the transmission mechanism, and a flow path at least a part of which is provided in the housing and through which a fluid can flow. The transmission mechanism includes a first shaft rotatable about a first axis extending in an axial direction, a second shaft rotatable about a second axis extending in parallel with the first axis, a third shaft rotatable about a third axis extending in parallel with the first axis and the second axis, a first bearing that supports the first shaft, a second bearing that supports the second shaft, and a third bearing that supports the third shaft. The housing includes a side wall covering the gear chamber from one side in an axial direction, and a first bearing holding portion that is provided on the side wall and holds the first bearing. A second bearing holding portion that is provided on the side wall and holds the second bearing is provided. A third bearing holding portion that is provided on the side wall and holds the third bearing is provided. The flow path includes a supply flow path portion that supplies a fluid to the inside of the second bearing holding portion, a first flow path portion that connects the inside of the second bearing holding portion and the inside of the first bearing holding portion, and a second flow path portion that connects the inside of the second bearing holding portion and the inside of the third bearing holding portion.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIG. 6 is a schematic view of a second bearing holding portion according to a second modification;

FIG. 10 is a schematic view of a second bearing holding portion of a sixth modification;

DETAILED DESCRIPTION

Figure 1:
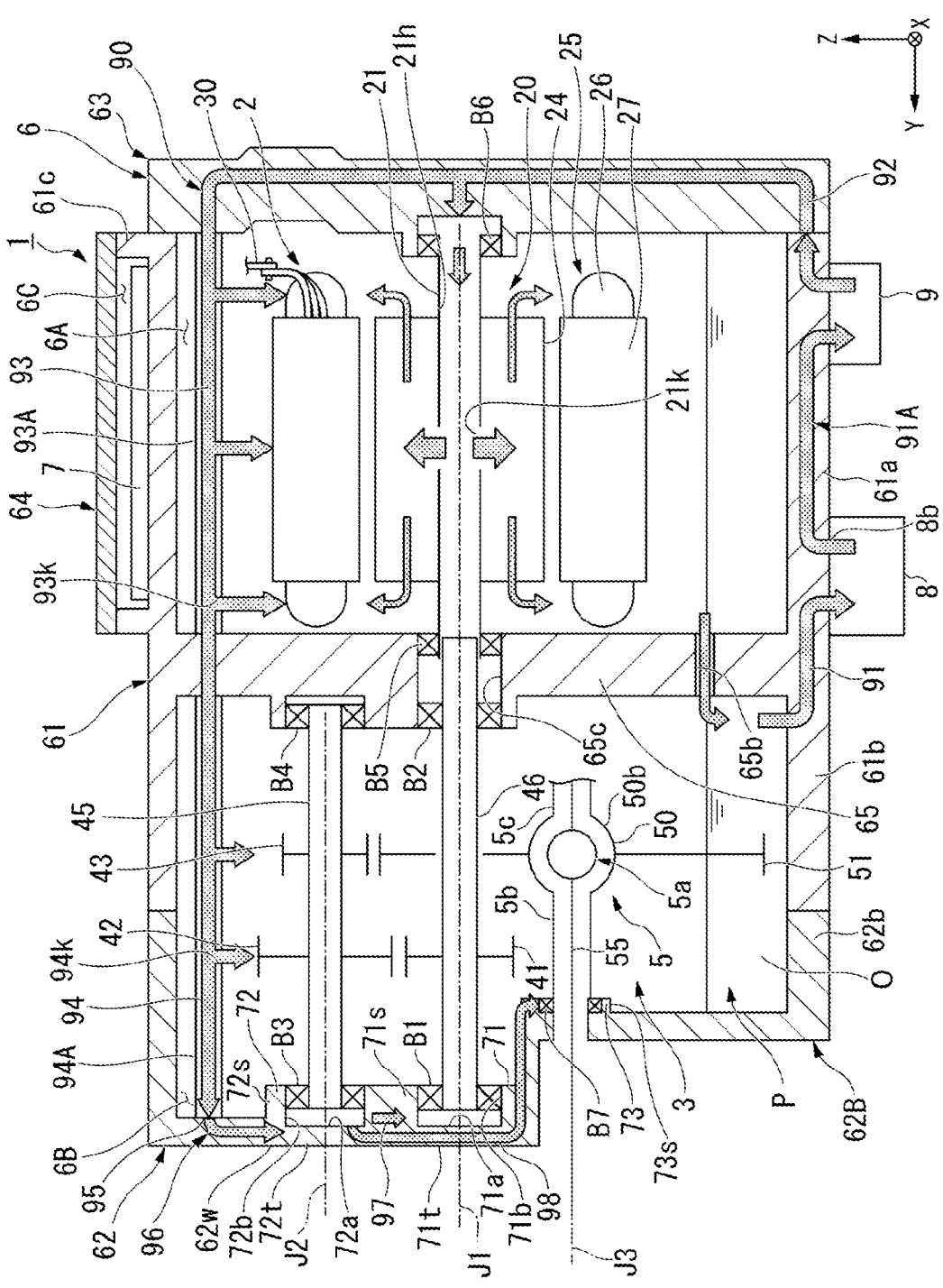
FIG. 1 is a conceptual diagram of a drive device of an embodiment.

A drive device according to an embodiment of the present invention will be described below with reference to the drawings. In description below, an up-down direction is defined based on a positional relationship when a drive device 1 of the present embodiment is mounted on a vehicle (not illustrated) positioned on a horizontal road surface.

In the drawings, an XYZ coordinate system is illustrated appropriately as a three-dimensional orthogonal coordinate system. In the XYZ coordinate system, a Z-axis direction corresponds to the up-down direction. The up-down direction is, for example, a vertical direction. A +Z side corresponds to an upper side in the vertical direction, while a –Z side corresponds to a lower side in the vertical direction. In the present embodiment, the upper side in the vertical direction will be referred to simply as the "upper side" and the lower side in the vertical direction will be simply referred to as the "lower side". An X-axis direction is a direction orthogonal to the Z-axis direction and is a vehicle front-rear direction on which the drive device 1 is mounted. In the present embodiment, a +X side is a front side of the vehicle, and a -X side is a rear side of the vehicle. A Y-axis direction corresponds to a left-right direction of the vehicle, i.e., a width direction of the vehicle, and is a direction perpendicular to both the X-axis direction and the Z-axis direction. The Y-axis direction corresponds to the axial directions of a first axis J1, a second axis J2, and a third axis J3, which will be described later. Each of the front-rear direction and the left-right direction is a horizontal direction perpendicular to the vertical direction.

The first axis J1, the second axis J2, and the third axis J3, which are appropriately shown in each figure, are parallel to each other and extend in the Y-axis direction (that is, the left-right direction of the vehicle and the direction along the horizontal plane). In the present specification, unless otherwise specified, a direction parallel to the axes J1, J2, and J3 is simply referred to as an "axial direction", a radial direction with the axis J1 as a center is simply referred to as a "radial direction", and a circumferential direction with the axis J1 as a center, that is, around the axis J1 is simply referred to as a "circumferential direction". "Extending in the axial direction" means extending in a direction in which the first axis J1, the second axis J2, and the third axis J3 extend. In the following description, one side in the axial direction means a +Y side in the direction along the Y axis, and the other side in the axial direction means a-Y side in the direction along the Y axis. Note that, in the present embodiment, the "parallel direction" also includes a substantially parallel direction, and the "perpendicular direction" also includes a substantially perpendicular direction. In addition, in the present specification, "facing the axial direction" means facing a direction parallel to the axial direction or a direction having an axial component.

In the following description, a vehicle front-rear direction which is a direction parallel to the X axis is simply referred to as a "first direction". The front side (+X side) of the vehicle is simply referred to as one side in the first direction, and the rear side (–X side) of the vehicle is simply referred to as the other side in the first direction. The first direction is a direction intersecting both the up-down direction and the axial direction.

FIG. 1 is a conceptual diagram of the drive device 1 according to the embodiment.

The drive device 1 of the present embodiment is mounted on an electric vehicle (EV) and is used as a power source thereof. Note that, the drive device 1 may be mounted on a vehicle including a motor as a power source, such as a hybrid electric car (HEV) or a plug-in hybrid electric car (PHV).

As illustrated in FIG. 1, the drive device 1 includes a motor 2, a transmission mechanism 3, an inverter 7, a housing 6, a fluid O, a pump 8, and a cooler 9. The motor 2, the transmission mechanism 3, and the inverter 7 are accommodated in the housing 6. The fluid O is stored in housing 6. The pump 8 and the cooler 9 are fixed to the outer side surface of the housing 6.

The motor 2 of the present embodiment is a three-phase AC motor. The motor 2 has both a function as an electric motor and a function as a generator. The motor 2 is located on the other side (–Y side) of the transmission mechanism 3 in the axial direction. The motor 2 includes a rotor 20 arranged to rotate about the first axis (motor axis) J1, which extends in a horizontal direction, and a stator 25 arranged radially outside of the rotor 20. The motor 2 of the present embodiment is an inner rotor type motor in which the rotor 20 is arranged inside the stator 25. The configuration of the motor 2 is not limited to the present embodiment.

The rotor 20 rotates about the first axis J1 extending in the horizontal direction. The rotor 20 includes a motor shaft 21, a rotor core 24 fixed to an outer peripheral surface of the motor shaft 21, and a rotor magnet (not illustrated) fixed to the rotor core.

The motor shaft 21 extends along the axial direction about the first axis J1. The motor shaft 21 rotates about the first axis J1. A first shaft 46 of the transmission mechanism 3 is connected to an end portion of the motor shaft 21 on one side (+Y side) in the axial direction. As a result, a torque of the rotor 20 is transmitted to the transmission mechanism 3. The motor shaft 21 is a hollow shaft. The motor shaft 21 is provided with a hole 21k extending radially outside from a hollow portion 21h. The motor shaft 21 is rotatably supported by the housing 6 via bearings B5 and B6.

The stator 25 is held by the housing 6. The stator 25 surrounds the rotor 20 from the radially outer side. The stator 25 includes a stator core 27 having a substantially annular shape centered on the first axis J1 and a coil 26 attached to the stator core 27. The stator core 27 is fixed to the housing 6.

The coil 26 is attached to each tooth portion of the stator core 27 with an insulator (not illustrated) therebetween. The coil 26 includes a plurality of coil wires. In addition, the coil 26 may be configured by connecting a plurality of rod-shaped conductors. A bus bar 30 is connected to the coil 26. An alternating current is supplied to the coil 26 via the bus bar 30.

The inverter 7 converts direct current supplied from a battery (not illustrated) into alternating current. The inverter 7 is connected to the coil 26 of the stator 25 via the bus bar 30. The inverter 7 supplies power to the motor 2 via the bus bar 30 to control the motor 2.

The transmission mechanism 3 is located on one side (–Y side) of the motor 2 in the axial direction. The transmission mechanism 3 transmits power of the motor 2 to output the power from an output shaft 55. The transmission mechanism 3 includes a first shaft 46, a first gear 41, a second shaft 45, a second gear 42, a third gear 43, a differential device 5, an output shaft 55, and a plurality of bearings B1, B2, B3, B4, and B7.

The first shaft 46 and the first gear 41 are disposed around the first axis J1. The first shaft 46 and the first gear 41 are rotatable about the first axis J1. The first shaft 46 extends in the axial direction of the first axis J1. The end portion on the other side (–Y side) in the axial direction of the motor shaft 21 is connected to the first shaft 46. The first shaft 46 rotates in synchronization with the motor shaft 21. The first gear 41 is provided on an outer peripheral surface of the first shaft 46. The first gear 41 rotates about the first axis J1 together with the first shaft 46. The first shaft 46 is rotatably supported by the housing 6 via the bearings B1 and B2.

The second shaft 45, the second gear 42, and the third gear 43 are disposed about the second axis J2 extending in parallel with the first axis J1. The second shaft 45, the second gear 42, and the third gear 43 are rotatable about the second axis J2. The second shaft 45 extends along the axial direction of the second axis J2. The second shaft 45 is rotatably supported by the housing 6 the via bearings B3 and B4. The second gear 42 and the third gear 43 are provided on the outer peripheral surface of the second shaft 45. The second gear 42 and the third gear 43 are disposed at intervals in the axial direction. The second gear 42 and the third gear 43 rotate around the second axis J2 together with the second shaft 45. The second gear 42 meshes with the first gear 41. The third gear 43 meshes with a ring gear 51 of the differential device 5 described below.

The differential device 5 includes a ring gear 51, a differential case 50, and a differential mechanism 5a. The differential device 5 is disposed about the third axis J3 extending in parallel with the first axis J1 and the second axis J2. The differential device 5 is rotatable about the third axis J3. The ring gear 51 meshes with the third gear 43. The ring gear 51 rotates about the third axis J3. The ring gear 51 is fixed to the differential case 50.

The differential case 50 includes a case portion 50b that accommodates the differential mechanism 5a therein, and a third shaft 5b and a fourth shaft 5c. The third shaft 5b protrudes from the outer side surface of the case portion 50b to one side (+Y side) in the axial direction. The fourth shaft 5c protrudes from the outer side surface of the case portion 50b to the other side (–Y side) in the axial direction. The third shaft 5b and the fourth shaft 5c have a cylindrical shape extending along the axial direction about the third axis J3. The output shaft 55 is disposed inside each of the third shaft 5b and the fourth shaft 5c. The third shaft 5b and the fourth shaft 5c rotate together with the ring gear 51 about the third axis J3. The third shaft 5b is rotatably supported by the housing 6 via the bearing B7. The fourth shaft 5c is rotatably supported by the housing 6 via a bearing (not illustrated).

That is, the transmission mechanism 3 includes the third shaft 5b and the fourth shaft 5c that are rotatable about the third axis J3. The differential device 5 includes a third shaft 5b and a fourth shaft 5c.

The differential mechanism 5a is disposed inside the differential case 50. The rotation of the ring gear 51 is transmitted to the differential mechanism 5a via the differential case 50. A pair of output shafts 55 is connected to the differential mechanism 5a. The differential mechanism 5a transfers the torque to the output shafts 55 of the left and right wheels while absorbing a difference in speed between the left and right wheels when the vehicle turns.

The pair of output shafts 55 extends from the differential mechanism 5a to one side and the other side in the axial direction about the third axis J3. The pair of output shafts 55 is rotatably supported by the housing 6 about the third axis J3 via bearings (not illustrated) arranged on the inner peripheral surface of the third shaft 5b or the fourth shaft 5c. A wheel (not illustrated) is connected to each of the pair of output shafts 55.

The torque output from the motor 2 is transmitted to the ring gear 51 of the differential device 5 via the motor shaft 21, the first shaft 46, the first gear 41, the second gear 42, the second shaft 45 and the third gear 43, and further, is transmitted to the wheel via the differential mechanism 5a, and the output shaft 55. In this manner, the transmission mechanism 3 transmits the torque of the motor 2 to the wheels of the vehicle.

The plurality of bearings B1, B2, B3, B4, B5, B6, and B7 are held by the housing 6. The bearings B1 and B2 are arranged around the first axis J1. The bearing B1 supports the end portion of the first shaft 46 on one side (+Y side) in the axial direction, and the bearing B2 supports the end portion of the first shaft 46 on the other side (−Y side) in the axial direction. The bearings B3 and B4 are disposed around the second axis J2. The bearing B3 supports the end portion of the second shaft 45 on one side (+Y side) in the axial direction, and the bearing B4 supports the end portion of the second shaft 45 on the other side (−Y side) in the axial direction. The bearings B5 and B6 are disposed around the first axis J1. The bearing B5 supports the end portion of the motor shaft 21 on one side (+Y side) in the axial direction, and the bearing B6 supports the end portion of the motor shaft 21 on the other side (−Y side) in the axial direction. The bearing B7 is disposed about the third axis J3. The bearing B7 supports the end portion of the third shaft 5b on one side (+Y side) in the axial direction. In the description of the present embodiment, the bearing B1 is referred to as a first bearing, the bearing B3 is referred to as a second bearing, and the bearing B7 is referred to as a third bearing.

The housing 6 is provided with a motor chamber 6A that accommodates the motor 2, a gear chamber 6B that accommodates the transmission mechanism 3, and an inverter chamber 6C that accommodates the inverter 7. The gear chamber 6B is located on one side (+Y side) of the motor chamber 6A in the axial direction. The inverter chamber 6C is located on the upper side (+Z side) of the motor chamber 6A.

The fluid O is stored in the housing 6. The housing 6 is provided with a flow path 90 through which the fluid O flows. That is, the drive device 1 includes the flow path 90 through which the fluid O can flow. The fluid O passes through the flow path 90 and circulates in the housing 6. The fluid O serves as a cooling refrigerant for the motor 2 and a lubricating oil for the transmission mechanism 3. An oil equivalent to a lubricating oil (ATF: Automatic Transmission Fluid) for an automatic transmission having a relatively low viscosity is preferably used as the fluid O in order to perform functions of a lubricating oil and a cooling oil.

The fluid O is accumulated in a lower region inside the housing 6. That is, the fluid O accumulates in the lower region in the housing 6. Hereinafter, the lower region in the housing 6 where the fluid O is stored is referred to as a reservoir P. In the housing 6 of the present embodiment, the bottom surface of the motor chamber 6A and the bottom surface of the gear chamber 6B are substantially aligned in the up-down direction. Therefore, the reservoir P is provided across the lower region of the motor chamber 6A and the lower region of the housing 6.

The ring gear 51 is immersed in the fluid O in the reservoir P. The ring gear 51 lifts up the fluid O in the reservoir P and scatters the fluid O into the gear chamber 6B as the ring gear rotates about the third axis J3. The fluid O scraped up by the ring gear 51 is supplied to each gear in the gear chamber 6B and used for lubrication of a tooth surface or the like of the gear.

The fluid O in the reservoir P passes through the flow path 90 and is sent to the upper region of the motor chamber 6A and the upper region of the gear chamber 6B. The fluid O sent to the upper region of the motor chamber 6A drops into the reservoir P in the lower region of the motor chamber 6A after cooling the motor 2 along the surface of the motor 2. The fluid O sent to the upper region of the gear chamber 6B lubricates each gear of the transmission mechanism 3 and a bearing supporting the transmission mechanism 3, and then returns to the reservoir P in the lower region of the gear chamber 6B.

The housing 6 is configured by combining a plurality of members. The housing 6 includes a housing body (first member) 61, a motor cover 63 located on the other side (−Y side) in the axial direction of the housing body 61, a gear cover (second member) 62 located on one side (+Y side) in the axial direction of the housing body 61, and an inverter cover 64 located on the upper side (+Z side) of the housing body 61.

The housing body 61 includes a partition wall 65, a first cylindrical portion 61a, a second cylindrical portion 61b, and a box-shaped portion 61c. The partition wall 65 extends along a plane orthogonal to the first axis J1. The first cylindrical portion 61a protrudes from the partition wall 65 to the other side (−Y side) in the axial direction. The first cylindrical portion 61a has a cylindrical shape surrounding the first axis J1. The second cylindrical portion 61b protrudes from the partition wall 65 to one side (+Y side) in the axial direction. The second cylindrical portion 61b has a cylindrical shape surrounding the first axis J1, the second axis J2, and the third axis J3. The box-shaped portion 61c has a box shape that is open upward with a part of the outer side surface of the first cylindrical portion 61a as a bottom surface. The opening of the box-shaped portion 61c is covered by the inverter cover 64. The inverter chamber 6C is provided in a space surrounded by the inner side surface of the box-shaped portion 61c and the inverter cover 64.

The partition wall 65 partitions the motor chamber 6A and the gear chamber 6B. The partition wall 65 is provided with a shaft insertion hole 65c and a partition wall opening 65b. The shaft insertion hole 65c and the partition wall opening 65b pass through the partition wall 65 in the axial direction. The shaft insertion hole 65c and the partition wall opening 65b connect the motor chamber 6A and the gear chamber 6B, and allow them to communicate with each other. The inner side surface of the shaft insertion hole 65c supports the motor shaft 21 and the first shaft 46 via bearings B5 and B2. In the present embodiment, the motor shaft 21 and the first shaft 46 are connected to each other inside the shaft insertion hole 65c. However, the motor shaft 21 and the first shaft 46 may be connected to each other outside the shaft insertion hole 65c. The partition wall opening 65b is positioned below the shaft insertion hole 65c. The partition wall opening 65b constitutes a flow path of the fluid O flowing from the motor chamber 6A to the gear chamber 6B.

The motor cover 63 has a plate shape extends along a plane orthogonal to the first axis J1. The motor cover 63 covers the opening on the other side (−Y side) in the axial direction of the first cylindrical portion 61a. The motor chamber 6A is provided in a space radially inside the first cylindrical portion 61a, on the other side (−Y side) in the axial direction of the partition wall 65, and on one side (+Y side) in the axial direction of the motor cover 63.

The gear cover 62 has a concave shape that is open to the other side (−Y side) in the axial direction. The gear cover 62 includes a plate-shaped side wall 62w extending along a plane orthogonal to the first axis J1 and a third cylindrical portion 62b protruding from the side wall 62w to the other side (−Y side) in the axial direction. The gear cover 62 covers an opening on one side (+Y side) in the axial direction of the second cylindrical portion 61b. An end surface on the other side (−Y side) in the axial direction of the third cylindrical portion 62b is connected to an end surface on one side (+Y side) in the axial direction of the second cylindrical portion 61b. The gear chamber 6B is provided in a space radially inside the second cylindrical portion 61b and the third cylindrical portion 62b, on one side (+Y side) in the axial direction of the partition wall 65, and on the other side (−Y side) in the axial direction of the side wall 62w. That is, the side wall 62w covers the gear chamber 6B from one side (+Y side) in the axial direction.

Figure 2:
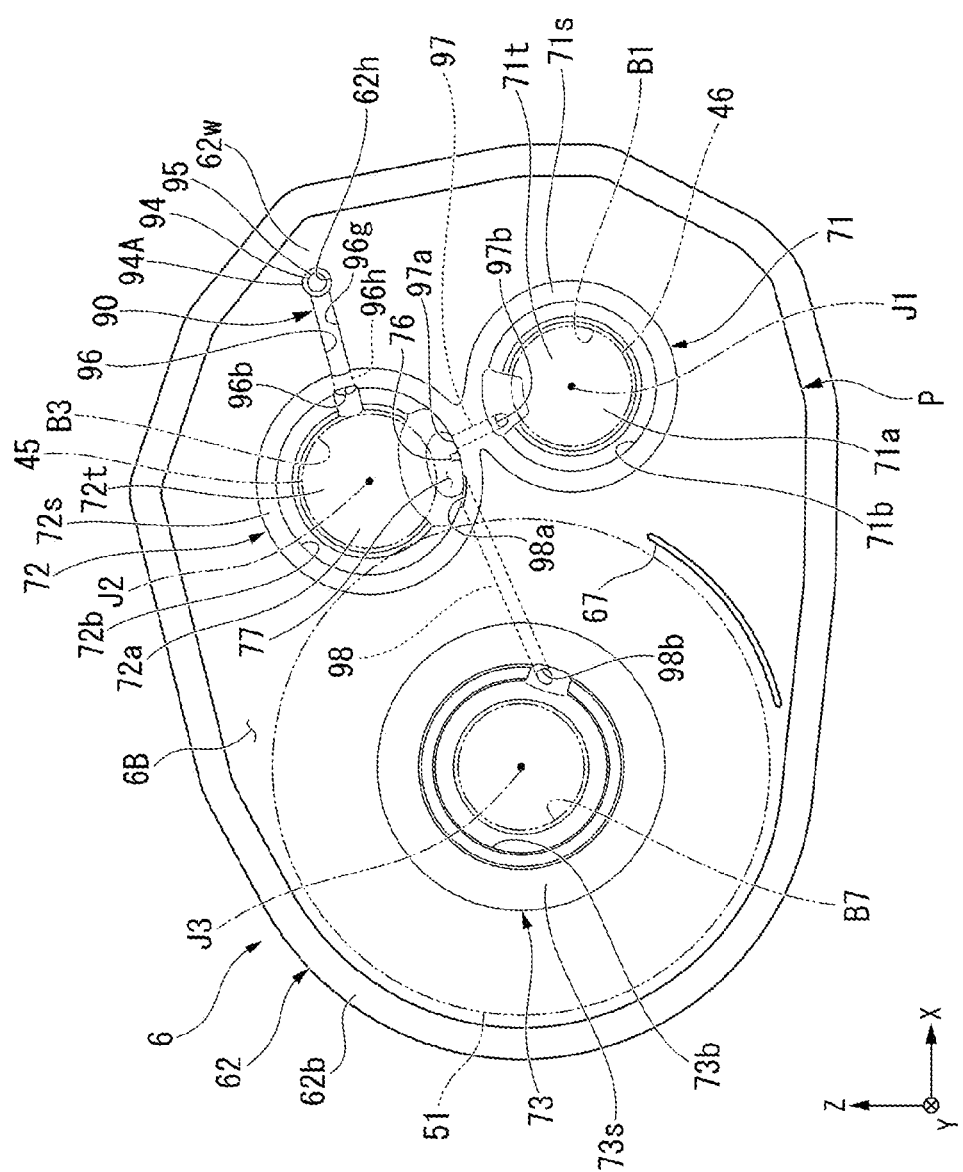
FIG. 2 is a front view of a side wall according to a drive device of an embodiment.

FIG. 2 is a front view of the side wall 62w according to the drive device 1 of the present embodiment.

The side wall 62w is provided with a first bearing holding portion 71, a second bearing holding portion 72, and a third bearing holding portion 73. That is, the housing 6 includes the first bearing holding portion 71, the second bearing holding portion 72, and the third bearing holding portion 73. The first bearing holding portion 71 holds the first bearing B1. The second bearing holding portion 72 holds the second bearing B3. The third bearing holding portion 73 holds the third bearing B7.

Figure 3:
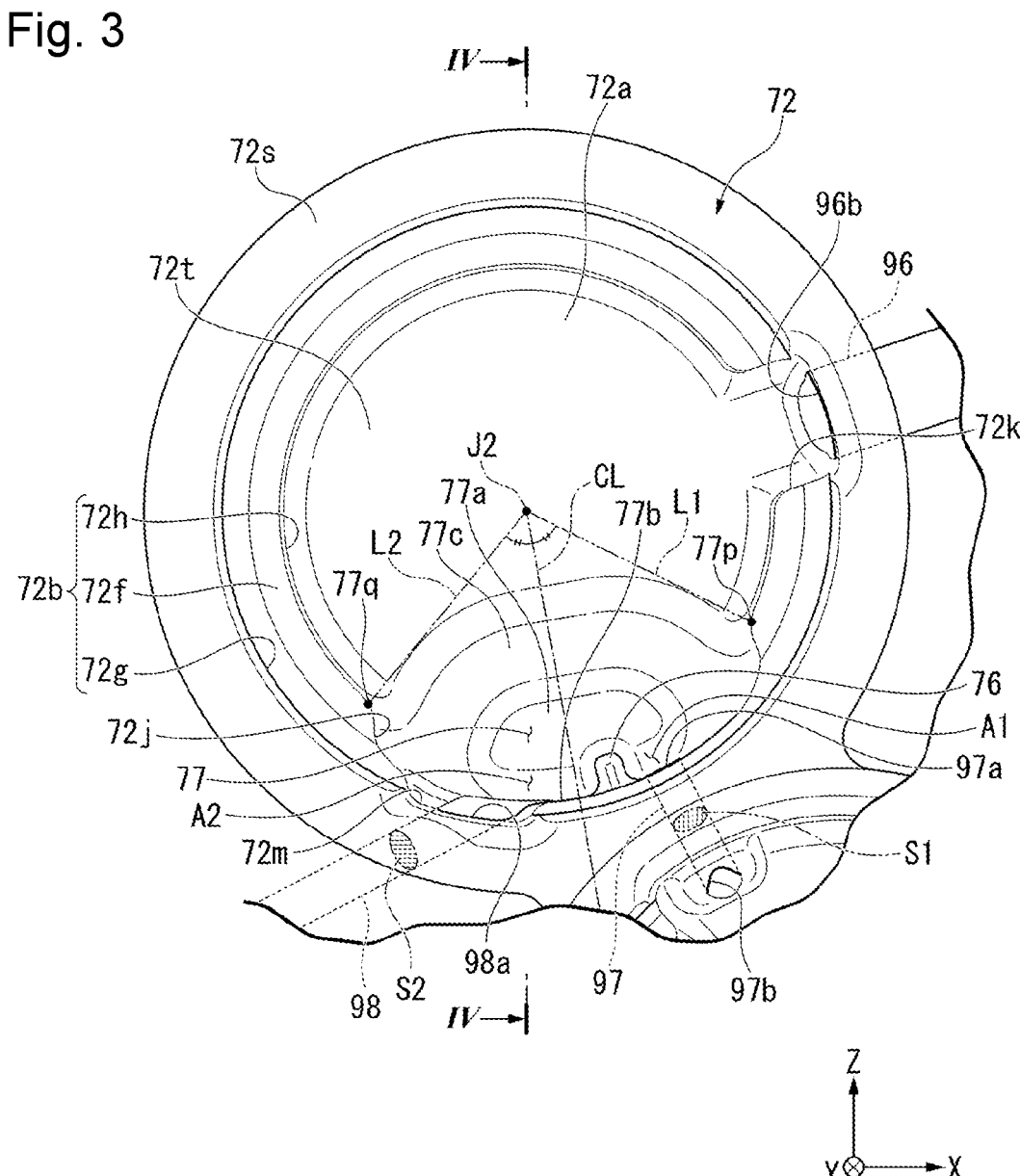
FIG. 3 is a front view of a second bearing holding portion according to an embodiment.
Figure 4:
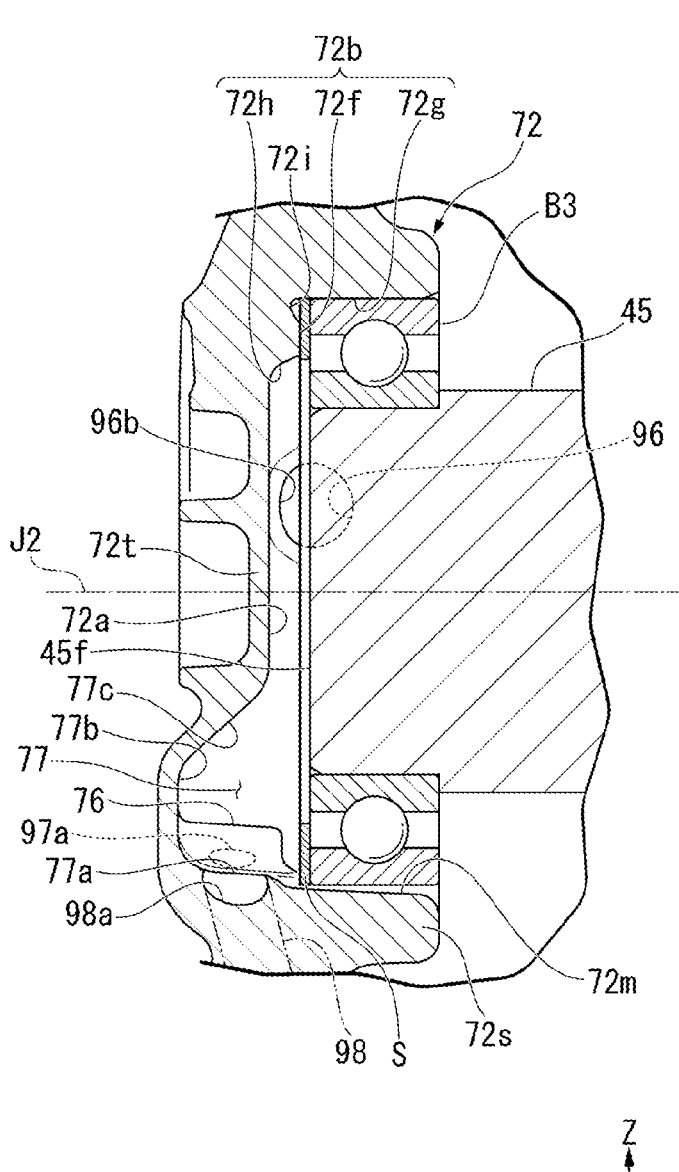
FIG. 4 is a schematic cross-sectional view of the second bearing holding portion taken along line IV-IV in FIG. 3.

FIG. 3 is a front view of the second bearing holding portion 72. FIG. 4 is a schematic cross-sectional view of the second bearing holding portion 72 taken along line IV-IV in FIG. 3.

As illustrated in FIG. 4, the second bearing holding portion 72 includes a second cylindrical portion (second wall) 72s and a second facing wall 72t. The second cylindrical portion 72s has a cylindrical shape centered on the second axis J2. The second cylindrical portion 72s surrounds the second bearing B3 from the radially outer side of the second axis J2. The second facing wall 72t extends along a plane orthogonal to the second axis J2. The second facing wall 72t is a part of the side wall 62w, and is a region surrounded by the second cylindrical portion 72s when viewed from the axial direction.

The second facing wall 72t has a second facing surface (facing surface) 72a facing the other side (−Y side) in the axial direction. That is, the second bearing holding portion 72 has the second facing surface 72a. The second facing surface 72a extends in a direction orthogonal to the axial direction. The second facing surface 72a is located on one side in the axial direction with respect to the end portion on one side (+Y side) in the axial direction of the second shaft

45. The second facing surface 72a faces an end surface 45f on one side in the axial direction of the second shaft 45 in the axial direction.

The second cylindrical portion 72s has a second inner side surface (inner side surface) 72b. That is, the second bearing holding portion 72 has the second inner side surface 72b. The second inner side surface 72b includes a stepped surface 72f facing the other side (−Y side) in the axial direction, a large diameter portion 72g located on the other side in the axial direction with respect to the stepped surface 72f, and a small diameter portion 72h located on one side in the axial direction with respect to the stepped surface 72f.

The stepped surface 72f has a substantially annular shape when viewed from the axial direction. A recessed groove 72i is provided on the outer edge of the stepped surface 72f. The recessed groove 72i is recessed from the surface on the other side in the axial direction of the stepped surface 72f to the one side in the axial direction. The recessed groove 72i extends in the circumferential direction when viewed from the axial direction. The stepped surface 72f supports the second bearing B3 from one side (+Y side) in the axial direction. A shim S having a substantially annular plate shape is disposed between the stepped surface 72f and the second bearing B3 in the axial direction.

The large diameter portion 72g is a cylindrical radially inner side surface extending in the axial direction with the second axis J2 as the center. The large diameter portion 72g extends from the outer edge of the stepped surface 72f to the other side (−Y side) in the axial direction. As described above, since the recessed groove 72i is provided in the outer edge of the stepped surface 72f of the present embodiment, the large diameter portion 72g is connected to the inner side surface of the recessed groove 72i. The large diameter portion 72g surrounds the outer side surface of the second bearing B3 from the radially outer side. The second inner side surface 72b supports the second bearing B3 in the large diameter portion 72g from the radially outer side about the second axis J2.

The small diameter portion 72h extends from the inner edge of the stepped surface 72f to one side (+Y side) in the axial direction. The small diameter portion 72h is connected to the second facing surface 72a. That is, the second inner side surface 72b extends from the second facing surface 72a to the other side (−Y side) in the axial direction in the small diameter portion 72h. The small diameter portion 72h is a cylindrical radially inner side surface extending in the axial direction with the second axis J2 as the center. The small diameter portion 72h has a smaller inner diameter than the large diameter portion 72g.

As illustrated in FIG. 3, the second inner side surface 72b is provided with a first concave portion 72j, a second concave portion 72k, and a third concave portion 72m. The first concave portion 72j and the second concave portion 72k are recessed radially outside from the small diameter portion 72h. The stepped surface 72f and the small diameter portion 72h are disconnected at the first concave portion 72j and the second concave portion 72k. The first concave portion 72j is disposed immediately below the second axis J2. The second concave portion 72k is disposed above the second axis J2.

In the present specification, "arranged immediately below" means arranged on the lower side and overlapping when viewed from the up-down direction.

The third concave portion 72m is recessed radially outside from the large diameter portion 72g. The third concave portion 72m is disposed radially outside the first concave portion 72j. The circumferential position of the third concave portion 72m overlaps the circumferential position of the first concave portion 72*j*. The third concave portion 72*m* overlaps a second opening 98*a* described later when viewed from the axial direction. As illustrated in FIG. 4, the bottom surface of the third concave portion 72*m* faces the outer peripheral surface of the second bearing B3 with a gap interposed therebetween. For example, when the fluid O is excessively supplied into the second bearing holding portion 72, the fluid O passes through the third concave portion 72*m* and flows out from the second bearing holding portion 72.

As illustrated in FIG. 3, the second facing surface 72*a* is provided with a recess 77 recessed to one side (+Y side) in the axial direction. In the present embodiment, the recess 77 is located immediately below the second axis J2. However, at least a part of the recess 77 may be located above the second axis J2. The recess 77 is disposed along the circumferential direction in a part of the large diameter portion 72*g*. The recess 77 is disposed inside the first concave portion 72*j* of the second inner side surface 72*b*. That is, the first concave portion 72*j* overlaps the recess 77 to be described later when viewed from the axial direction.

As illustrated in FIG. 4, the recess 77 has a side wall surface 77*a*, a bottom wall surface 77*b*, and an inclined surface 77*c*. The bottom wall surface 77*b* is a surface facing the other side (−Y side) in the axial direction. The bottom wall surface 77*b* extends along a plane orthogonal to the axial direction.

The side wall surface 77*a* is a surface facing radially inward. The side wall surface 77*a* extends from the bottom wall surface 77*b* to the other side (−Y side) in the axial direction. The side wall surface 77*a* extends in a substantially arc shape when viewed from the axial direction. The side wall surface 77*a* is connected to the small diameter portion 72*h* of the second inner side surface 72*b*. The side wall surface 77*a* can be regarded as a part of the second inner side surface 72*b*.

As illustrated in FIG. 3, the inclined surface 77*c* extends to both sides in the first direction (X-axis direction) on the upper side of the bottom wall surface 77*b* when viewed in the axial direction. That is, the inclined surface 77*c* surrounds the bottom wall surface 77*b* from three directions when viewed from the axial direction. As illustrated in FIG. 4, the inclined surface 77*c* is connected to the bottom wall surface 77*b*. In the direction orthogonal to the axial direction, the dimension between the inclined surface 77*c* and the bottom wall surface 77*b* gradually increases toward the other side (−Y side) in the axial direction.

A wall 76 is provided on the second inner side surface 72*b*. The wall 76 protrudes radially inward from the small diameter portion 72*h* of the second inner side surface 72*b*. The wall 76 overlaps the recess 77 when viewed from the axial direction. As illustrated in FIG. 4, the wall 76 extends along the axial direction. The wall 76 extends to the inside of the recess 77. That is, a portion on one side in the axial direction of the wall 76 protrudes radially inward from the side wall surface 77*a* of the recess 77. The wall 76 is connected to the bottom wall surface 77*b* of the recess 77.

As illustrated in FIG. 2, the first bearing holding portion 71 includes a first cylindrical portion (first wall) 71*s* and a first facing wall 71*t*. The first cylindrical portion 71*s* has a substantially cylindrical shape centered on the first axis J1. The first cylindrical portion 71*s* surrounds the first bearing B1 from the radially outer side of the first axis J1. As illustrated in FIG. 1, the first cylindrical portion 71*s* has a first inner side surface 71*b*. The first inner side surface 71*b* supports the first bearing B1 from the radial outside about the first axis J1. Although not illustrated, the first cylindrical portion 71*s* has substantially the same configuration as the second cylindrical portion 72*s* described above. That is, the first inner side surface 71*b* is provided with a stepped portion, a large diameter portion, and a small diameter portion similar to those of the second inner side surface 72*b*. The first facing wall 71*t* extends along a plane orthogonal to the first axis J1. The first facing wall 71*t* is a part of the side wall 62*w*, and is a region surrounded by the first cylindrical portion 71*s* when viewed from the axial direction. The first facing wall 71*t* has a first facing surface 71*a* facing the other side (−Y side) in the axial direction. The first facing surface 71*a* extends in a direction orthogonal to the axial direction. The first facing surface 71*a* is located on one side in the axial direction with respect to an end portion on one side (+Y side) in the axial direction of the first shaft 46. The first facing surface 71*a* faces the end surface on one side in the axial direction of the first shaft 46 in the axial direction. The first facing surface 71*a* is connected to the first inner side surface 71*b*. That is, the first inner side surface 71*b* extends from the first facing surface 71*a* to the other side (−Y side) in the axial direction.

As illustrated in FIG. 2, the third bearing holding portion 73 has a third cylindrical portion (third wall) 73*s*. The third cylindrical portion 73*s* has a substantially cylindrical shape centered on the third axis J3. The third cylindrical portion 73*s* surrounds the third bearing B7 from the radially outer side of the third axis J3. The third cylindrical portion 73*s* extends from the side wall 62*w* to the other side (−Y side) in the axial direction. The third cylindrical portion 73*s* has a third inner side surface 73*b*. The third inner side surface 73*b* supports the third bearing B7 from the radial outside about the third axis J3. Although not illustrated, the third cylindrical portion 73*s* has substantially the same configuration as the second cylindrical portion 72*s* described above. That is, the third inner side surface 73*b* is provided with a stepped portion, a large diameter portion, and a small diameter portion similar to those of the second inner side surface 72*b*.

As illustrated in FIG. 2, the gear chamber 6B is provided with a guide wall 67 extending in a curved manner along the tooth tip of the ring gear 51. In the present embodiment, the guide wall 67 is a rib protruding from the side wall 62*w* to the other side (−Y side) in the axial direction. The guide wall 67 extends in a substantially arc shape about the third axis J3. The guide wall 67 is curved along the tooth tip of the ring gear 51. The guide wall 67 guides the fluid O in the reservoir P in the circumferential direction around the third axis J3 along the tooth tip of the ring gear 51 by the surface facing the radial inside of the third axis J3. The fluid O is efficiently scraped up by the ring gear 51 by providing the guide wall 67. Note that the guide wall 67 may be a member separate from the side wall 62*w*. The partition wall 65 may be provided as a rib protruding to one side in the axial direction. The guide wall 67 may be configured by combining a rib provided on the side wall 62*w* and protruding to the other side (−Y side) in the axial direction and a rib provided on the partition wall 65 and protruding to one side (+Y side) in the axial direction.

The flow path 90 illustrated in FIG. 1 is a circulation path through which the fluid O flows. That is, the fluid O flows through the flow path 90 provided in the housing 6. At least a part of the flow path 90 may be provided in the housing 6. The flow path 90 is a path of the fluid O that is fed to the fluid O from the fluid reservoir P to the motor 2 and the transmission mechanism 3. In the present specification, the concept of the "flow path" is not only a path that constantly generates a flow of the fluid O directed in one direction, but also a path that temporarily retains the fluid O and a path in which the fluid O drips.

The pump 8, the cooler 9, the first supply pipe 93A, and the second supply pipe 94A are disposed in the flow path 90. The first supply pipe 93A and the second supply pipe 94A are disposed inside the housing 6.

The pump 8 sucks and pressure-feeds the fluid O from the reservoir P of the gear chamber 6B. The pump 8 supplies the fluid O to the motor 2 and the transmission mechanism 3. In the present embodiment, the pump 8 is an electric pump driven by electricity.

The cooler 9 cools the fluid O in the flow path 90. A refrigerant (not illustrated) flows inside the oil cooler 9. The cooler 9 is a heat exchanger that transfers the heat of fluid O to the refrigerant. The fluid O pumped from the pump 8 flows into the cooler 9. The flowed fluid O is cooled by heat exchange with the refrigerant in the cooler 9. The refrigerant is separately cooled by a radiator (not illustrated).

The first supply pipe 93A is disposed in the motor chamber 6A. In the present embodiment, two first supply pipes 93A are provided. The two first supply pipes 93A extend along the axial direction on the radially outer side of the stator 25. The end portion on one side (+Y side) in the axial direction of the first supply pipe 93A is supported by the partition wall 65, and the end portion on the other side (−Y side) in the axial direction is supported by the motor cover 63. The first supply pipe 93A is provided with a plurality of ejection holes 93k opened toward the stator 25. The number of first supply pipes 93A is not limited to two. For example, one first supply pipe 93A may be provided, or three or more first supply pipes may be provided.

The second supply pipe 94A is disposed in the gear chamber 6B. The second supply pipe 94A extends along the axial direction. The end portion on one side (+Y side) in the axial direction of the second supply pipe 94A is supported by the gear cover 62, and the end portion on the other side (−Y side) in the axial direction is supported by the partition wall 65. The second supply pipe 94A of the present embodiment is arranged side by side with the first supply pipe 93A in the axial direction. The second supply pipe 94A is provided with a plurality of ejection holes 94k opened toward the transmission mechanism 3. The first supply pipe 93A and the second supply pipe 94A may not be arranged side by side in the axial direction.

The flow path 90 of the present embodiment includes a suction flow path portion 91, a first pressure feed flow path portion 91A, a second pressure feed flow path portion 92, a third pressure feed flow path portion 93, a fourth pressure feed flow path portion 94, a feed portion 95, a supply flow path portion 96, a first flow path portion 97, and a second flow path portion 98. The third pressure feed flow path portion 93 and the fourth pressure feed flow path portion 94 are flow paths passing through the inside of the first supply pipe 93A and the second supply pipe 94A, respectively.

The suction flow path portion 91 is a flow path connecting the reservoir P and the pump 8. The first pressure feed flow path portion 91A extends from the pump 8 to the motor cover 63. The cooler 9 is disposed in the path of the first pressure feed flow path portion 91A. The second pressure feed flow path portion 92 is provided in the motor cover 63. The second pressure feed flow path portion 92 is connected to the first pressure feed flow path portion 91A at the upstream end portion. The second pressure feed flow path portion 92 branches into two on the way, is connected to the hollow portion 21h of the motor shaft 21 through a first branch path, and is connected to the first supply pipe 93A through a second branch path. Part of the fluid O flowing into the second pressure feed flow path portion 92 flows into the hollow portion 21h and the first supply pipe 93A. Part of the fluid O supplied to the hollow portion 21h is supplied to the bearings B5 and B6 supporting the motor shaft 21 to lubricate the bearings B5 and B6. The other part of the fluid O supplied to the hollow portion 21h passes through the hole 21k by centrifugal force, scatters radially outside from the rotor 20, and is supplied to the stator 25.

The fluid O supplied to the first supply pipe 93A flows through the third pressure feed flow path portion 93 provided inside the first supply pipe 93A. Part of the fluid O flowing through the third pressure feed flow path portion 93 is supplied to the motor 2 via the ejection hole 93k. The downstream end portion of the third pressure feed flow path portion 93 is connected to the fourth pressure feed flow path portion 94. The fourth pressure feed flow path portion 94 is provided inside the second supply pipe 94A. Part of the fluid O flowing into the fourth pressure feed flow path portion 94 is supplied to the transmission mechanism 3 via the ejection hole 94k.

As illustrated in FIG. 2, the side wall 62w of the gear cover 62 is provided with a support recess 62h recessed to one side (+Y side) in the axial direction. The end portion on one side (+Y side) in the axial direction of the second supply pipe 94A is inserted into the support recess 62h. The end portion on one side (+Y side) in the axial direction of the second supply pipe 94A functions as a feed portion 95 that supplies the fluid O to the gear chamber 6B.

The supply flow path portion 96 extends linearly when viewed from the axial direction. The supply flow path portion 96 is inclined downward toward the other side (−Y side) in the first direction. The supply flow path portion 96 extends from the support recess 62h to the inside of the second bearing holding portion 72. The supply flow path portion 96 has a groove portion 96g and a hole 96h. The groove portion 96g is connected to the feed portion 95. The groove portion 96g is provided on a surface facing the other side (−Y side) in the axial direction of the side wall 62w and is recessed to one side (+Y side) in the axial direction. The hole 96h is connected to the downstream side of the groove portion 96g. The hole 96h penetrates the second cylindrical portion 72s of the second bearing holding portion 72 in the radial direction. The fluid O flowing out from the end portion of the second supply pipe 94A reaches the inside of the second bearing holding portion 72 through the supply flow path portion 96 and lubricates the second bearing B3. That is, the supply flow path portion 96 supplies the fluid O to the inside of the second bearing holding portion 72. The groove portion 96g may be a hole provided inside the side wall 62w. The hole 96h may be a groove formed by notching the second cylindrical portion 72s.

The first flow path portion 97 is a hole portion connecting the inside of the second bearing holding portion 72 and the inside of the first bearing holding portion 71. In the present embodiment, the first flow path portion 97 extends linearly over the entire length. The first flow path portion 97 is inclined in a direction positioned downward toward one side (+Y side) in the first direction. The fluid O inside the second bearing holding portion 72 reaches the inside of the first bearing holding portion 71 through the first flow path portion 97 and lubricates the first bearing B1.

The second flow path portion 98 is a hole portion connecting the inside of the second bearing holding portion 72 and the inside of the third bearing holding portion 73. In the present embodiment, the second flow path portion 98 extends linearly over the entire length. The second flow path portion 98 is inclined in a direction positioned downward toward the other side (−Y side) in the first direction. The fluid O inside the second bearing holding portion 72 reaches the inside of the third bearing holding portion 73 through the second flow path portion 98 and lubricates the third bearing B7. Note that the second flow path portion 98 may not extend linearly over the entire length. For example, it may be bent or curved.

The flow path 90 of the present embodiment includes a supply flow path portion 96 that supplies the fluid O to the second bearing holding portion 72. A part of the fluid O supplied to the second bearing holding portion 72 is used for lubrication of the second bearing B3. The flow path 90 of the present embodiment includes a first flow path portion 97 and a second flow path portion 98. The fluid O that has not been used for lubrication of the second bearing B3 in the second bearing holding portion 72 moves to the first bearing holding portion 71 and the third bearing holding portion 73 via the first flow path portion 97 and the second flow path portion 98, respectively. As a result, the fluid O can be used for lubricating the first bearing B1 and the third bearing. According to the flow path 90 of the present embodiment, the fluid O can be supplied to the plurality of bearings B1, B3, and B7, and seizure of these bearings B1, B3, and B7 can be suppressed.

The first flow path portion 97 and the second flow path portion 98 of the present embodiment branch and extend from the second bearing holding portion 72, and are connected to the inside of the first bearing holding portion 71 and the third bearing holding portion 73, respectively. According to the present embodiment, the fluid O can flow from the inside of the second bearing holding portion 72 to the first flow path portion 97 and the second flow path portion 98, and can be supplied to the first bearing holding portion 71 and the third bearing holding portion 73, respectively. According to the flow path 90 of the present embodiment, by connecting the first bearing holding portion 71 and the third bearing holding portion 73 in parallel to the second bearing holding portion 72, the fluid O can be stably supplied to the first bearing B1 and the third bearing B7 as compared with the flow path connecting three or more bearing holding portions in series.

The fluid O in each of the flow path portions (supply flow path portion 96, first flow path portion 97, and second flow path portion 98) in the gear chamber 6B moves downward by gravity. Therefore, when the fluid O is moved between the plurality of bearing holding portions, one bearing holding portion on the upstream side needs to be disposed above the bearing holding portions on the downstream side. However, when a flow path connecting three or more bearing holding portions in series is configured, it is necessary to arrange three or more bearing holding portions side by side in the up-down direction, and thus the gear chamber 6B becomes large in the up-down direction. In the flow path 90 of the present embodiment, the first bearing holding portion 71 and the third bearing holding portion 73 are connected in parallel to the second bearing holding portion 72. As a result, the first bearing holding portion 71 and the third bearing holding portion 73 can be arranged side by side in the first direction (X-axis direction). According to the present embodiment, upsizing of the gear chamber 6B in the up-down direction can be suppressed, and as a result, downsizing of the drive device 1 can be achieved.

As illustrated in FIG. 3, the second inner side surface 72b of the second bearing holding portion 72 is provided with a first opening 97a, a second opening 98a, and a third opening 96b. The first opening 97a and the second opening 98a are located below the second axis J2. The third opening 96b is located above the second axis J2. At least a part of the third opening 96b may be located below the second axis J2.

The third opening 96b is an end portion of the supply flow path portion 96. The third opening 96b is connected to the second concave portion 72k. The third opening 96b is located at the lower end of the supply flow path portion 96. The third opening 96b is located above the second axis J2. The third opening 96b is located above the first opening 97a and the second opening 98a. The fluid O flows into the second bearing holding portion 72 from the third opening 96b.

The first opening 97a is an end portion of the first flow path portion 97. The first opening 97a is located at an upper end of the first flow path portion 97. The second opening 98a is an end portion of the second flow path portion 98. The second opening 98a is located at an upper end of the second flow path portion 98. The first opening 97a and the second opening 98a are located below the second axis J2. The first opening 97a and the second opening 98a are arranged side by side in the first direction (X-axis direction) in the vicinity of the lower end of the second inner side surface 72b. The first opening 97a is located on one side (+X side) in the first direction with respect to the second opening 98a. The fluid O flows out of the second bearing holding portion 72 through the first opening 97a and the second opening 98a.

As illustrated in FIG. 4, the first opening 97a and the second opening 98a are open toward the recess 77. Therefore, the first flow path portion 97 and the second flow path portion 98 are connected to the inside of recess 77 via the first opening 97a and the second opening 98a, respectively. According to the present embodiment, since the recess 77 is provided in the second facing surface 72a, the fluid O flowing into the second bearing holding portion 72 can be stored in the recess 77. As a result, it is possible to suppress that the fluid O flows out from the inside of the second bearing holding portion 72 to the outside and the supply to the first bearing holding portion 71 and the third bearing holding portion 73 becomes insufficient. According to the present embodiment, the first flow path portion 97 and the second flow path portion 98 are connected to the recess 77, so that the fluid O stored in the recess 77 can be sufficiently supplied to the first bearing holding portion 71 and the third bearing holding portion 73.

As illustrated in FIG. 3, the wall 76 divides a lower region in the second bearing holding portion 72 into two regions in the circumferential direction. Here, two regions partitioned by the wall 76 are referred to as a first region A1 and a second region A2. The first region A1 and the second region A2 are arranged in the circumferential direction with the wall 76 interposed therebetween. The first region A1 is located on one side (+X side) in the first direction with respect to the second region A2. The wall 76 of the present embodiment extends to the inside of the recess 77. Therefore, each of the first region A1 and the second region A2 also includes a region partitioned by the wall 76 inside the recess 77. The fluid O is accumulated in each of the first region A1 and the second region A2. According to the present embodiment, since the wall 76 partitions the first region A1 and the second region A2, even when the vehicle on which the drive device 1 is mounted is inclined, it is possible to suppress the storage amount of the fluid O from being biased to one of the first region A1 and the second region A2.

In the present embodiment, the second opening 98a is located below the first opening 97a. Therefore, the fluid O flowing in from the third opening 96b easily flows into the second opening 98*a* before the first opening 97*a* and is supplied to the second flow path portion 98. The fluid O supplied from the supply flow path portion 96 flows into the first region A1 and comes into contact with the surface on one side (+X side) in the first direction of the wall. Since the oil in contact with the wall flows into the first opening 97*a* before the second opening 98*a*, the fluid O can be stably supplied to the first flow path portion 97. The second opening 98*a* may be located above the first opening 97*a*.

The wall 76 is located between the first opening 97*a* and the second opening 98*a* in the circumferential direction. The first opening 97*a* is located on one side in the circumferential direction with respect to the wall 76, and the second opening 98*a* is located on the other side in the circumferential direction with respect to the wall 76. The first opening 97*a* is open in the first region A1, and the second opening 98*a* is open in the second region A2. The fluid O accumulated in the first region A1 is supplied to the first bearing holding portion 71 via the first flow path portion 97. The fluid O accumulated in the second region A2 is supplied to the third bearing holding portion 73 via the second flow path portion 98. According to the present embodiment, even when the vehicle on which the drive device 1 is mounted is inclined, it is possible to suppress supply of the fluid O to only one of the first bearing holding portion 71 and the third bearing holding portion 73, and it is easy to stably supply the fluid O to each bearing holding portion.

In the present embodiment, the first opening 97*a* is located on one side (+X side) in the first direction with respect to the wall 76. The second opening 98*a* is located on the other side (−X side) in the first direction with respect to the wall 76. Further, the third opening 96*b* is located on one side (+X side) in the first direction with respect to the wall 76. That is, the first opening 97*a* and the third opening 96*b* are disposed on the same side in the first direction (X-axis direction) with respect to the wall 76, and the second opening 98*a* is disposed on the opposite side. The fluid O flowing from the third opening 96*b* into the second bearing holding portion 72 easily flows along a region on one side (+X side) in the first direction of the second inner side surface 72*b* and first flows into the first region A1 where the first opening 97*a* is open. According to the present embodiment, the fluid O in the second bearing holding portion 72 easily flows to the first flow path portion 97 earlier than the second flow path portion 98, and the fluid O can be supplied to the first bearing B1 earlier than the third bearing B7.

As in the present embodiment, when the third shaft 5*b* is a part of the differential device 5, the first shaft 46 has a larger rotation speed than the third shaft 5*b*. Therefore, in the first bearing B1 supporting the first shaft 46, the fluid O is likely to be insufficient as compared with the third bearing B7, and lubrication may be insufficient. According to the present embodiment, it is possible to suppress insufficient lubrication of the first bearing B1 by first supplying the fluid O to the first bearing B1 in which the fluid O is likely to be insufficient.

As illustrated in FIG. 3, when the recess 77 is viewed from the axial direction, a first virtual line L1 connecting the end portion 77*p* on one side in the circumferential direction of the recess 77 and the second axis J2 is assumed. When the recess 77 is viewed from the axial direction, a second virtual line L2 connecting the end portion 77*q* of the recess 77 on the other side in the circumferential direction and the second axis J2 is assumed. Further, a bisector of the first virtual line L1 and the second virtual line L2 is defined as a center line CL. In the present specification, the center line CL is referred to as a circumferential center of the recess 77.

In the present embodiment, both the wall 76 and the first opening 97*a* are arranged on one side in the circumferential direction with respect to the center line CL, and the second opening 98*a* is arranged on the other side in the circumferential direction with respect to the center line CL. That is, the wall 76 of the present embodiment is disposed on the first opening 97*a* side with respect to the circumferential center (center line CL) of the recess 77. According to the present embodiment, the volume of the second region A2 can be made larger than the volume of the first region A1. As a result, the second region A2 can store more fluid O than the first region A1.

As in the present embodiment, when the third shaft 5*b* is a part of the differential device 5, the third shaft 5*b* has a smaller rotation speed than the first shaft 46. Therefore, the third bearing B7 can reduce the amount of the fluid O required for lubrication as compared with the first bearing B1. According to the present embodiment, by storing a larger amount of the fluid O in the second region A2 where the second opening 98*a* is open, the fluid O can be stably supplied to the third bearing B7. When the third shaft 5*b* is a part of the differential device 5, a load is applied to the third bearing B7 more than the load applied to the first bearing B1, so that the fluid O tends to be insufficient. According to the present embodiment, the fluid O can be stably supplied to the second bearing B3, seizure of the third bearing B7 can be suppressed, and reliability of the drive device 1 can be enhanced.

In the present embodiment, the third bearing B7 is a tapered roller bearing. In this case, for example, lubrication is required more than ball bearings. According to the present embodiment, by storing more fluid O in the second region A2, more fluid O can be supplied to the third bearing B7 which is a tapered roller bearing, and seizure of the third bearing B7 can be suppressed. The third bearing B7 is not limited to a tapered roller bearing. The third bearing B7 may be, for example, a ball bearing. At least one of the first bearing B1 and the second bearing B3 may be a tapered roller bearing.

In the present embodiment, the cross-sectional area S2 of the second flow path portion 98 is larger than the cross-sectional area S1 of the first flow path portion 97. In the present embodiment, since the second flow path portion 98 has a longer flow path length than the first flow path portion 97, the flow path resistance tends to increase. According to the present embodiment, by making the cross-sectional area S2 of the second flow path portion 98 larger than the cross-sectional area S1 of the first flow path portion 97, the flow path resistance of the second flow path portion 98 can be reduced, and the fluid O can be smoothly supplied to the third bearing B7. Here, the cross-sectional areas S1 and S1 of the first flow path portion 97 and the second flow path portion 98 are so-called flow path cross-sectional areas, and mean cross-sectional areas of the respective flow path portions in a cross section orthogonal to the extending direction of the respective flow path portions.

As illustrated in FIG. 2, the first inner side surface 71*b* is provided with a fourth opening 97*b*. The fourth opening 97*b* is an end portion of the first flow path portion 97, and is located at a lower end of the first flow path portion 97. The fourth opening 97*b* is located above the first axis J1. The fluid O flows into the first bearing holding portion 71 from the fourth opening 97*b*.

The third inner side surface 73*b* is provided with a fifth opening 98*b*. The fifth opening 98*b* is an end portion of the second flow path portion 98, and is located at a lower end of the second flow path portion 98. The fifth opening 98*b* is located below the third axis J3. The fluid O flows into the third bearing holding portion 73 from the fifth opening 98*b*.

The fluid O in the flow path 90 of the present embodiment is pumped by the pump 8. The pump 8 of the present embodiment is an electrically controlled electric pump. Therefore, the pump 8 can stably supply the fluid O to each of the bearings B1 and B3 regardless of the driving state of the transmission mechanism 3 as compared with the case of a mechanical pump that is driven in conjunction with the operation of the transmission mechanism 3. Specifically, for example, when insufficient lubrication of the bearings B1 and B3 is concerned, such as when the drive device 1 is not driven for a long period of time, the pump 8 can be driven in advance before the motor 2 is driven, and the fluid O can be supplied to the gear chamber 6B. Accordingly, the bearings B1 and B3 and the transmission mechanism 3 can be lubricated.

In the present embodiment, on the downstream side of the supply flow path portion 96, the end portion on one side in the axial direction of the groove portion 96*g* is provided on one side in the axial direction with respect to the second facing surface 72*a*. As a result, at least a part of the fluid O supplied from the feed portion 95 flows toward one side in the axial direction as flowing downward inside the groove portion 96*g*. As a result, it is possible to suppress the fluid O from flowing to the other side in the axial direction before being supplied to the hole 96*h*. Therefore, more fluid O can be supplied into the second bearing holding portion 72.

The second bearing holding portions of first to sixth modifications which can be employed in the drive device of the first embodiment will be described. In the description of each modification described below, the same reference numerals are given to the same components as those of the embodiment or modification described above, and the description thereof will be omitted.

Although the third opening is not illustrated in the third to sixth modifications, a third opening that guides the fluid to the inside of the second bearing holding portion is open on the second inner side surface of the second bearing holding portion. The arrangement of the third opening is not particularly limited, and may be, for example, either the third opening 96*b* of the first modification (see FIG. 5) or the third opening 296*b* of the second modification (see FIG. 6).

Figure 5:
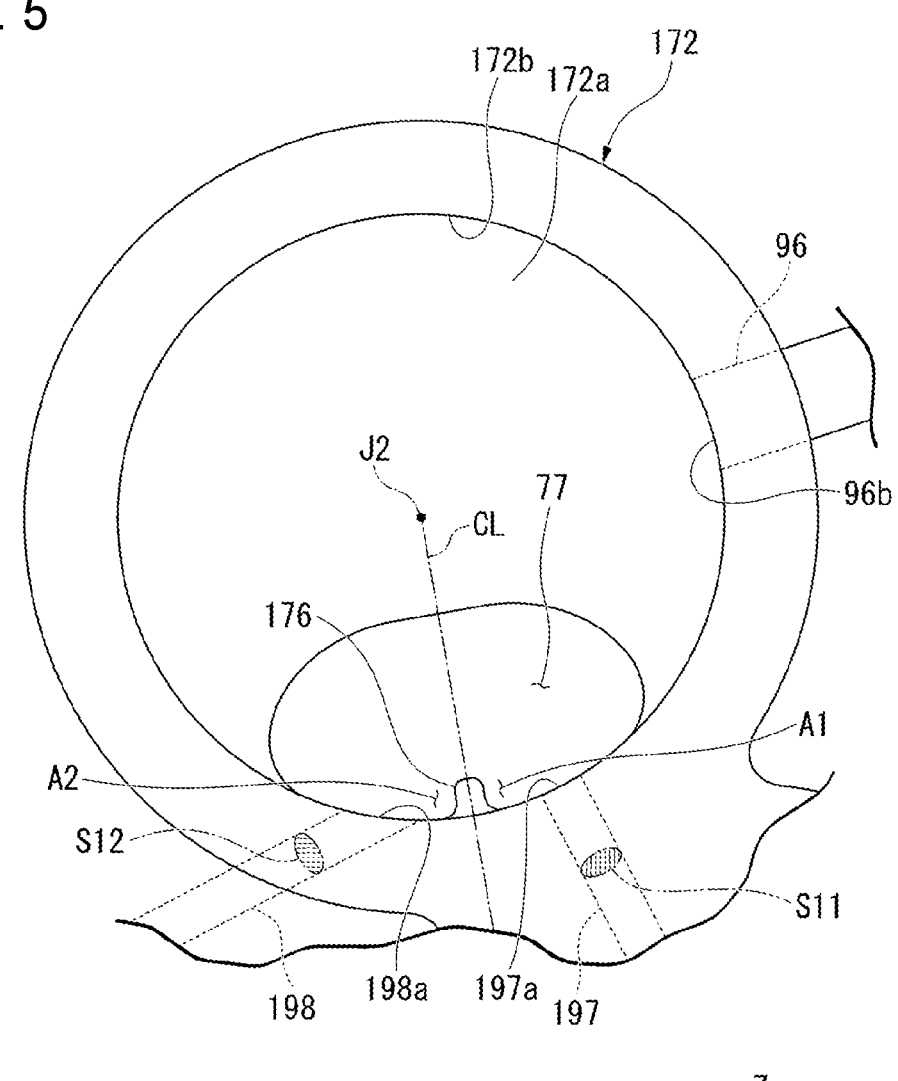
FIG. 5 is a schematic view of a second bearing holding portion according to a first modification.

FIG. 5 is a schematic view of a second bearing holding portion 172 of the first modification.

Similarly to the above-described embodiment, the second bearing holding portion 172 of the present modification has a second facing surface 172*a* and a second inner side surface 172*b*. The second facing surface 172*a* is provided with a recess 77. The wall 176 is provided on the second inner side surface 172*b*. A first opening 197*a*, a second opening 198*a*, and a third opening 96*b* are open in the second inner side surface 172*b*. The first opening 197*a* is an end portion of a first flow path portion 197 connecting the inside of the second bearing holding portion 172 and the inside of the first bearing holding portion 71 (see FIG. 2). The second opening 198*a* is an end portion of a second flow path portion 198 connecting the inside of the second bearing holding portion 172 and the inside of the third bearing holding portion 73 (see FIG. 2). The third opening 96*b* is an end portion of the supply flow path portion 96 that supplies the fluid O to the inside of the second bearing holding portion 172. The wall 176 is positioned between the first opening 197*a* and the second opening 198*a*.

In the present modification, the wall 176 is disposed on the center line CL. That is, the wall 176 is disposed at the circumferential center of the recess 77. The volumes of the first region A1 and the second region A2 are substantially equal. In the present modification, the cross-sectional area S11 of the first flow path portion 197 is substantially equal to the cross-sectional area S12 of the second flow path portion 198.

In the present modification, the first opening 197*a* is located on one side (+X side) in the first direction with respect to the wall 176. The second opening 198*a* is located on the other side (−X side) in the first direction with respect to the wall 176. Further, the third opening 96*b* is located on one side (+X side) in the first direction with respect to the wall 176. That is, the first opening 197*a* and the third opening 96*b* are disposed on the same side in the first direction (X-axis direction) with respect to the wall 176, and the second opening 198*a* is disposed on the opposite side. Therefore, the fluid O flowing into the second bearing holding portion 172 from the third opening 96*b* tends to flow along the region on one side (+X side) in the first direction of the second inner side surface 172*b* and to accumulate first in the first region A1 where the first opening 197*a* is open. According to the present modification, the fluid O in the second bearing holding portion 172 can flow to the first flow path portion 197 earlier than the second flow path portion 198, and the fluid O can be supplied to the first bearing B1 earlier than the third bearing B7. According to the present modification, it is possible to suppress a decrease in driving efficiency of the first bearing B1 by first supplying the fluid O to the first bearing B1 in which the fluid O tends to be insufficient.

Figure 6:
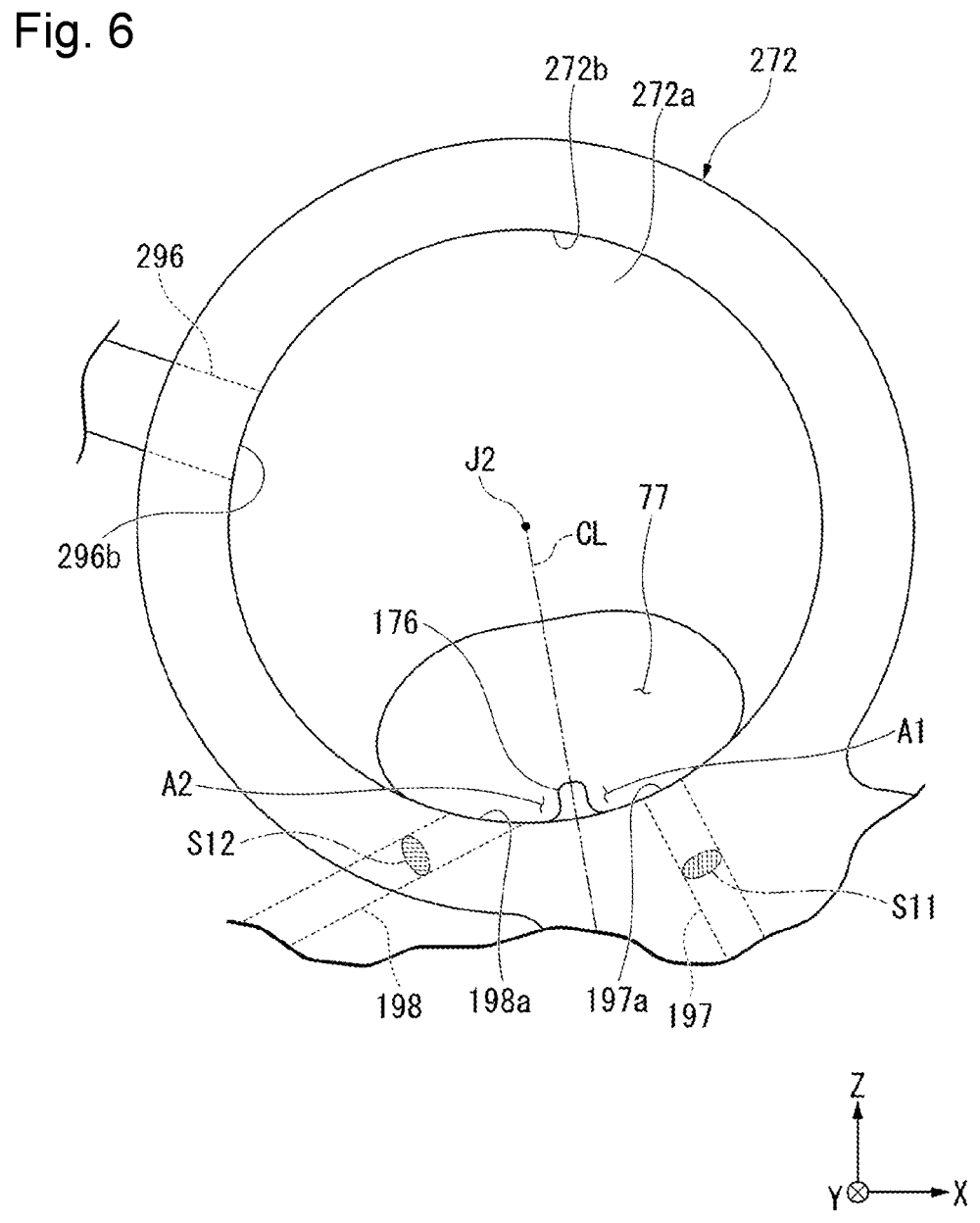

FIG. 6 is a schematic view of a second bearing holding portion 272 of a second modification.

Similarly to the above-described embodiment, the second bearing holding portion 272 of the present modification has a second facing surface 272*a* and a second inner side surface 272*b*. The second facing surface 272*a* is provided with a recess 77. The wall 176 is provided on the second inner side surface 272*b*. A first opening 197*a*, a second opening 198*a*, and a third opening 296*b* are open in the second inner side surface 272*b*. The third opening 296*b* is an end portion of the supply flow path portion 296 that supplies the fluid O to the inside of the second bearing holding portion 272.

In the present modification, the first opening 197*a* is located on one side (+X side) in the first direction with respect to the wall 176. The second opening 198*a* is located on the other side (−X side) in the first direction with respect to the wall 176. Further, the third opening 296*b* is located on the other side (−X side) in the first direction with respect to the wall 176. That is, the second opening 198*a* and the third opening 296*b* are disposed on the same side in the first direction (X-axis direction) with respect to the wall 176, and the first opening 197*a* is disposed on the opposite side. Therefore, the fluid O flowing into the second bearing holding portion 272 from the third opening 296*b* tends to flow along the region on the other side (−X side) in the first direction of the second inner side surface 272*b* and to accumulate first in the second region A2 where the second opening 198*a* is open. According to the present modification, the fluid O in the second bearing holding portion 272 can flow to the second flow path portion 198 earlier than the first flow path portion 197, and the fluid O can be supplied to the third bearing B7 earlier than the first bearing B1. According to the present modification, it is possible to suppress seizure of the third bearing B7 by first supplying the fluid O to the third bearing B7 to which a load is applied.

Figure 7:
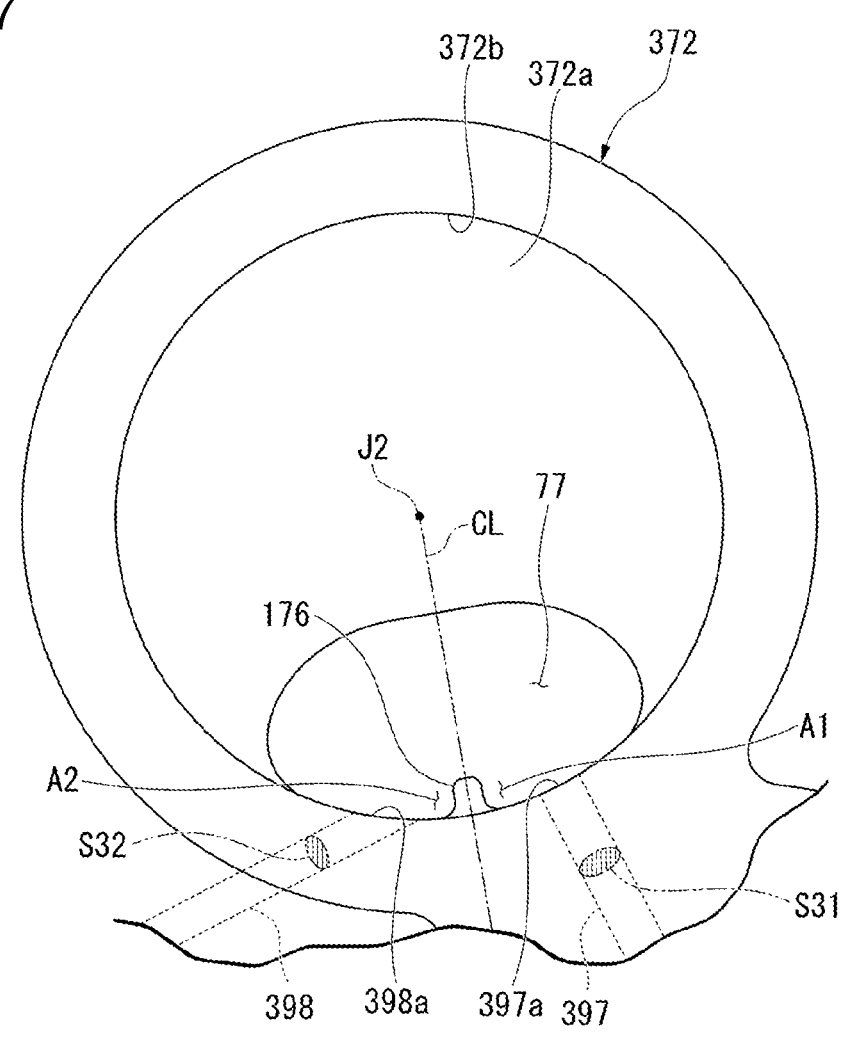
FIG. 7 is a schematic view of a second bearing holding portion according to a third modification.
Figure 7:
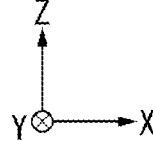

FIG. 7 is a schematic view of a second bearing holding portion 372 of a third modification.

Similarly to the above-described embodiment, the second bearing holding portion 372 of the present modification has a second facing surface 372a and a second inner side surface 372b. The second facing surface 372a is provided with a recess 77. The wall 176 is provided on the second inner side surface 372b. A first opening 397a, a second opening 398a, and a third opening (not illustrated) are open in the second inner side surface 372b. The first opening 397a is an end portion of a first flow path portion 397 connecting the inside of the second bearing holding portion 372 and the inside of the first bearing holding portion 71 (see FIG. 2). The second opening 398a is an end portion of a second flow path portion 398 connecting the inside of the second bearing holding portion 372 and the inside of the third bearing holding portion 73 (see FIG. 2).

In the present modification, the cross-sectional area S31 of the first flow path portion 397 is larger than the cross-sectional area S32 of the second flow path portion 398. According to the present modification, the fluid O in the second bearing holding portion 372 easily flows to the first flow path portion 397 rather than the second flow path portion 398, and the fluid O can be preferentially supplied to the first bearing B1 rather than the third bearing B7. According to the present modification, it is possible to suppress insufficient lubrication of the first bearing B1 by preferentially supplying the fluid O to the first bearing B1 in which the fluid O tends to be insufficient.

Figure 8:
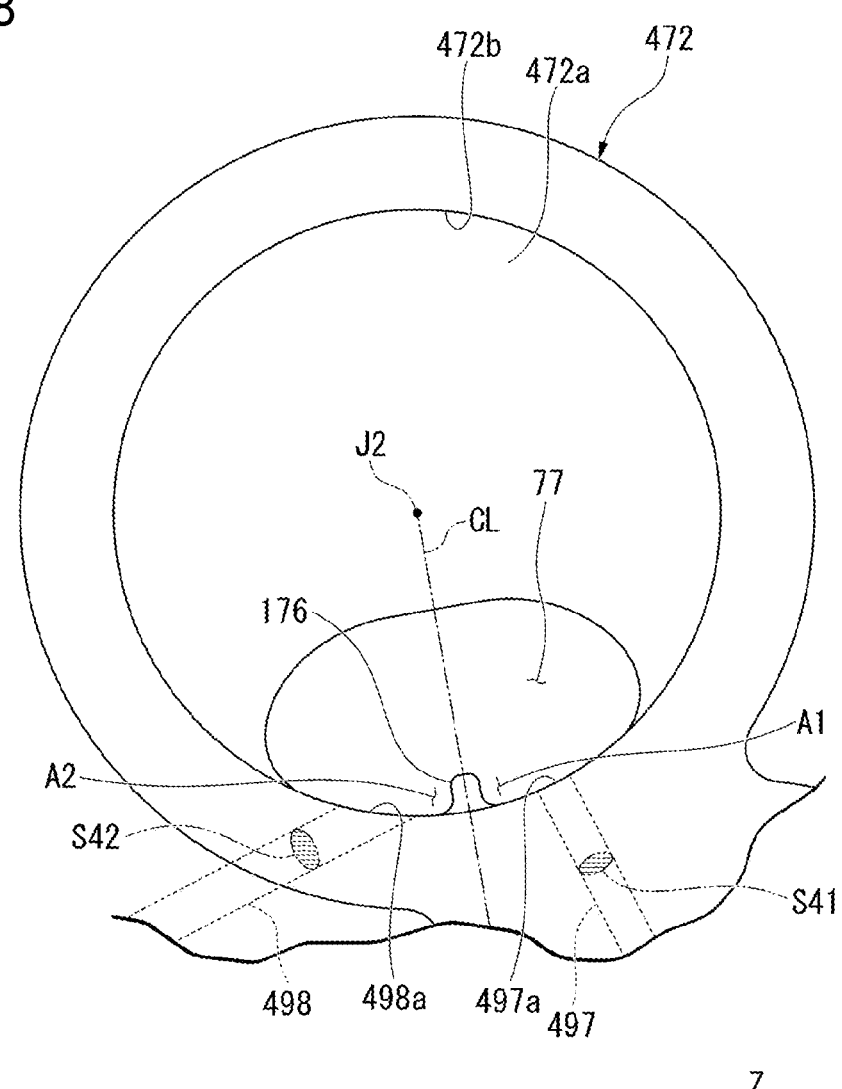
FIG. 8 is a schematic view of a second bearing holding portion according to a fourth modification.

FIG. 8 is a schematic view of a second bearing holding portion 472 of a fourth modification.

Similarly to the above-described embodiment, the second bearing holding portion 472 of the present modification has a second facing surface 472a and a second inner side surface 472b. The second facing surface 472a is provided with a recess 77. The wall 176 is provided on the second inner side surface 472b. A first opening 497a, a second opening 498a, and a third opening (not illustrated) are open in the second inner side surface 472b. The first opening 497a is an end portion of a first flow path portion 497 connecting the inside of the second bearing holding portion 472 and the inside of the first bearing holding portion 71 (see FIG. 2). The second opening 498a is an end portion of a second flow path portion 498 connecting the inside of the second bearing holding portion 472 and the inside of the third bearing holding portion 73 (see FIG. 2).

In the present modification, the cross-sectional area S42 of the second flow path portion 498 is larger than the cross-sectional area S41 of the first flow path portion 497. According to the present modification, the fluid O in the second bearing holding portion 472 easily flows to the second flow path portion 498 rather than the first flow path portion 497, and the fluid O can be preferentially supplied to the third bearing B7 rather than the first bearing B1. According to the present modification, it is possible to suppress seizure of the third bearing B7 by preferentially supplying the fluid O to the third bearing B7 to which a load is applied.

Figure 9:
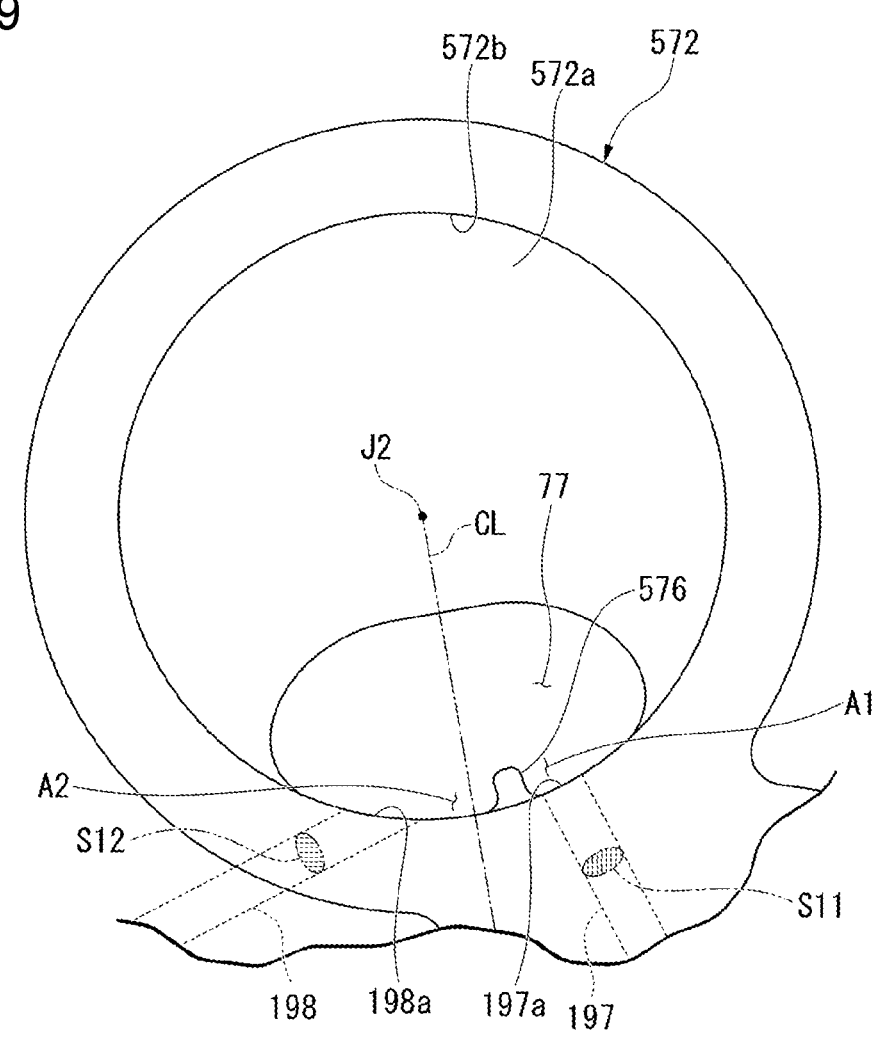
FIG. 9 is a schematic view of a second bearing holding portion according to a fifth modification.

FIG. 9 is a schematic view of a second bearing holding portion 572 of a fifth modification.

Similarly to the above-described embodiment, the second bearing holding portion 572 of the present modification has a second facing surface 572a and a second inner side surface 572b. The second facing surface 572a is provided with a recess 77. The wall 576 is provided on the second inner side surface 572b. A first opening 197a, a second opening 198a, and a third opening (not illustrated) are open in the second inner side surface 572b. The wall 576 is positioned between the first opening 197a and the second opening 198a.

In the present modification, the wall 576 extends from the second inner side surface 572b to the inside of the recess 77, and is disposed on the first opening 197a side with respect to the circumferential center of the recess 77. That is, according to the present modification, both the wall 576 and the first opening 197a are arranged on one side in the circumferential direction with respect to the center line CL, and the second opening 198a is arranged on the other side in the circumferential direction with respect to the center line CL. According to the present modification, the volume of the second region A2 where the second opening 198a is open can be made larger than the volume of the first region A1 where the first opening 197a opens. According to the present modification, it is possible to send more fluid O to the third bearing B7 from the second opening 198a, and it is possible to suppress seizure of the third bearing B7 by preferentially supplying the fluid O to the third bearing B7 to which a load is applied.

Figure 10:
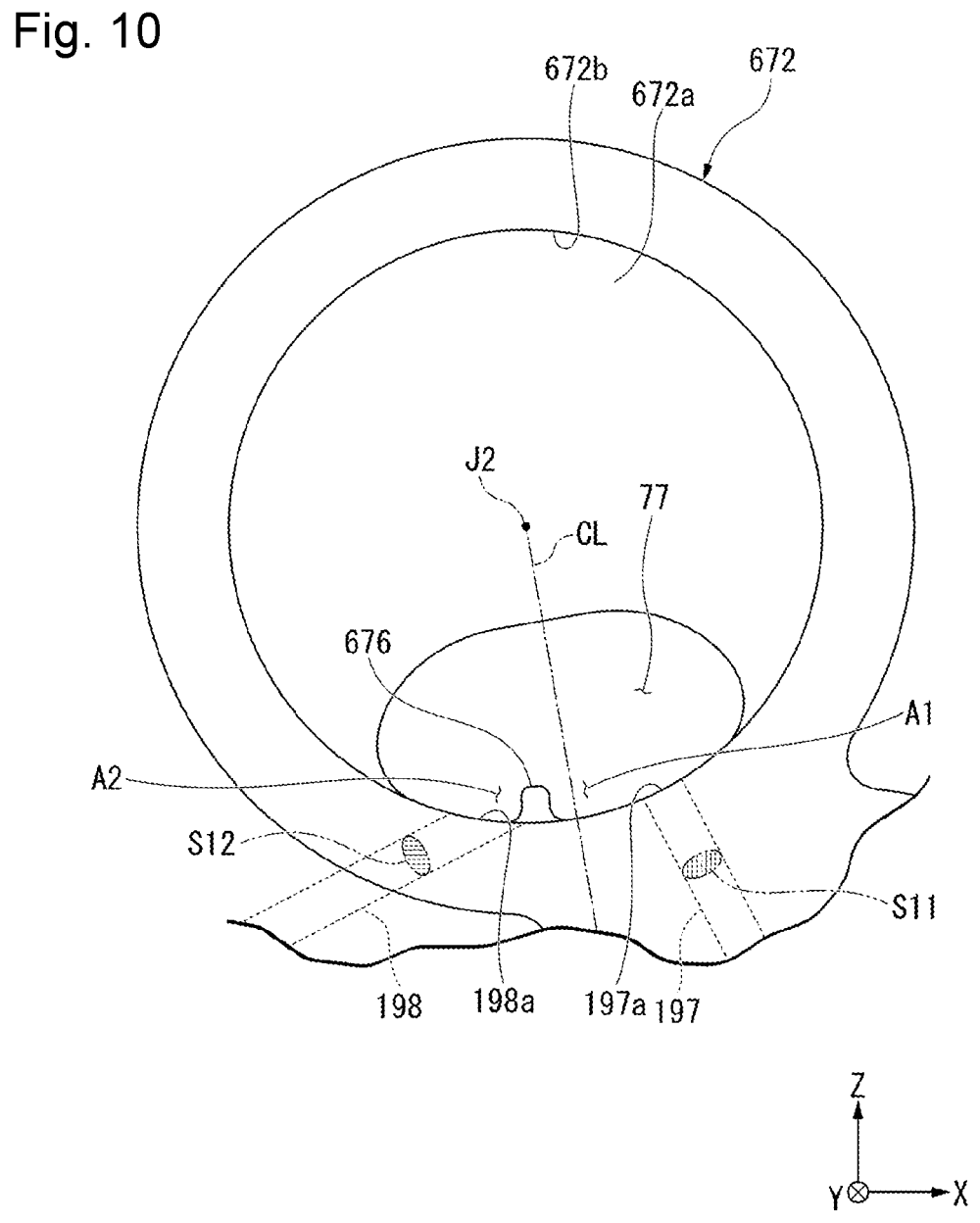

FIG. 10 is a schematic view of a second bearing holding portion 672 of a sixth modification.

Similarly to the above-described embodiment, the second bearing holding portion 672 of the present modification has a second facing surface 672a and a second inner side surface 672b. The second facing surface 672a is provided with a recess 77. The wall 676 is provided on the second inner side surface 672b. A first opening 197a, a second opening 198a, and a third opening (not illustrated) are open in the second inner side surface 672b. The wall 676 is positioned between the first opening 197a and the second opening 198a.

In the present modification, the wall 676 extends to the inside of the recess 77 and is arranged on the second opening 198a side with respect to the circumferential center of the recess 77. That is, according to the present modification, the first opening 197a is disposed on one side in the circumferential direction with respect to the center line CL, and both the wall 676 and the second opening 198a are disposed on the other side in the circumferential direction with respect to the center line CL. According to the present modification, the volume of the first region A1 in which the first opening 197a is open can be made larger than the volume of the second region A2 in which the second opening 198a is open. According to the present modification, more fluid O can be sent from the first opening 197a to the first bearing B1, and insufficient lubrication of the first bearing B1 can be suppressed by first supplying the fluid O to the first bearing B1 in which the fluid O tends to be insufficient.

Figure 11:
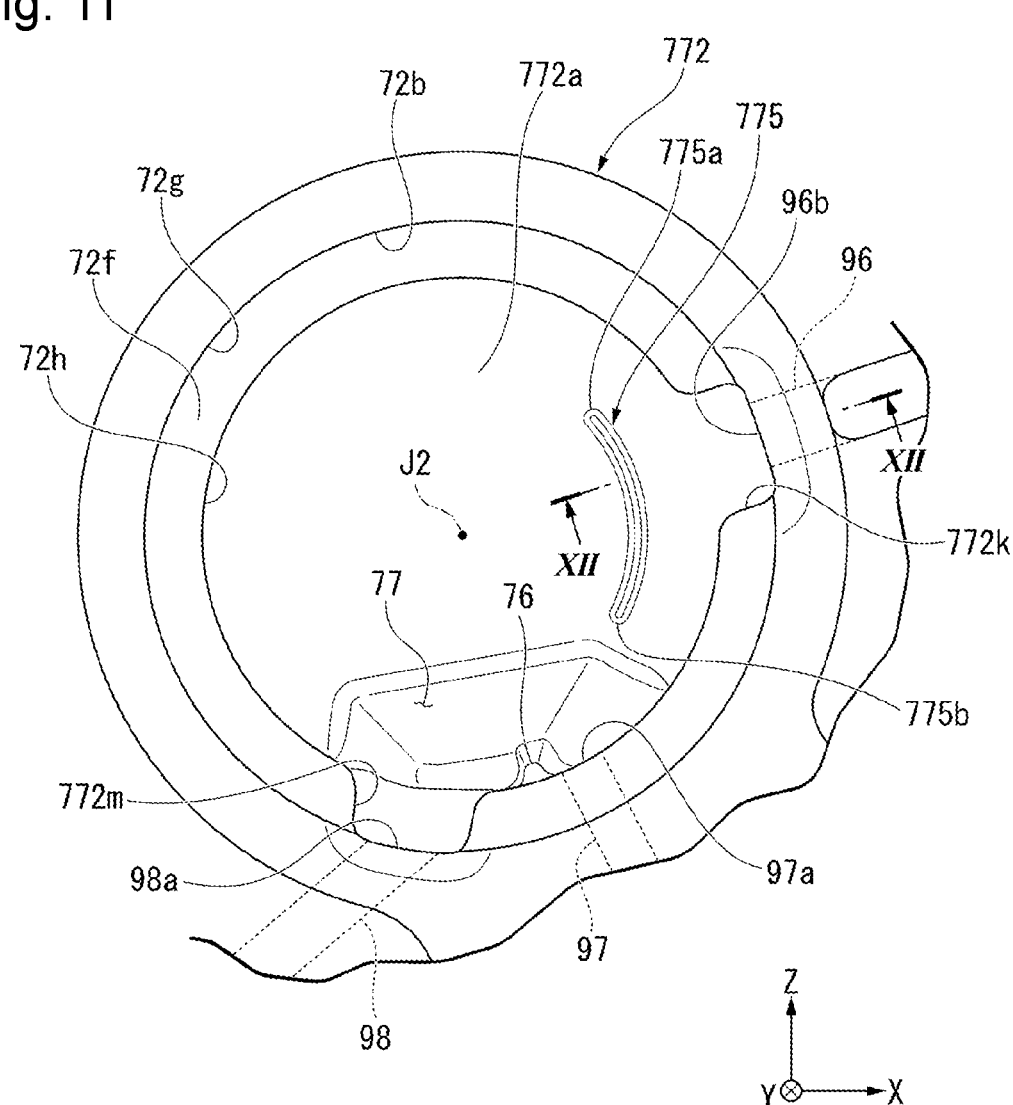
FIG. 11 is a schematic view of a second bearing holding portion of a seventh modification.
Figure 12:
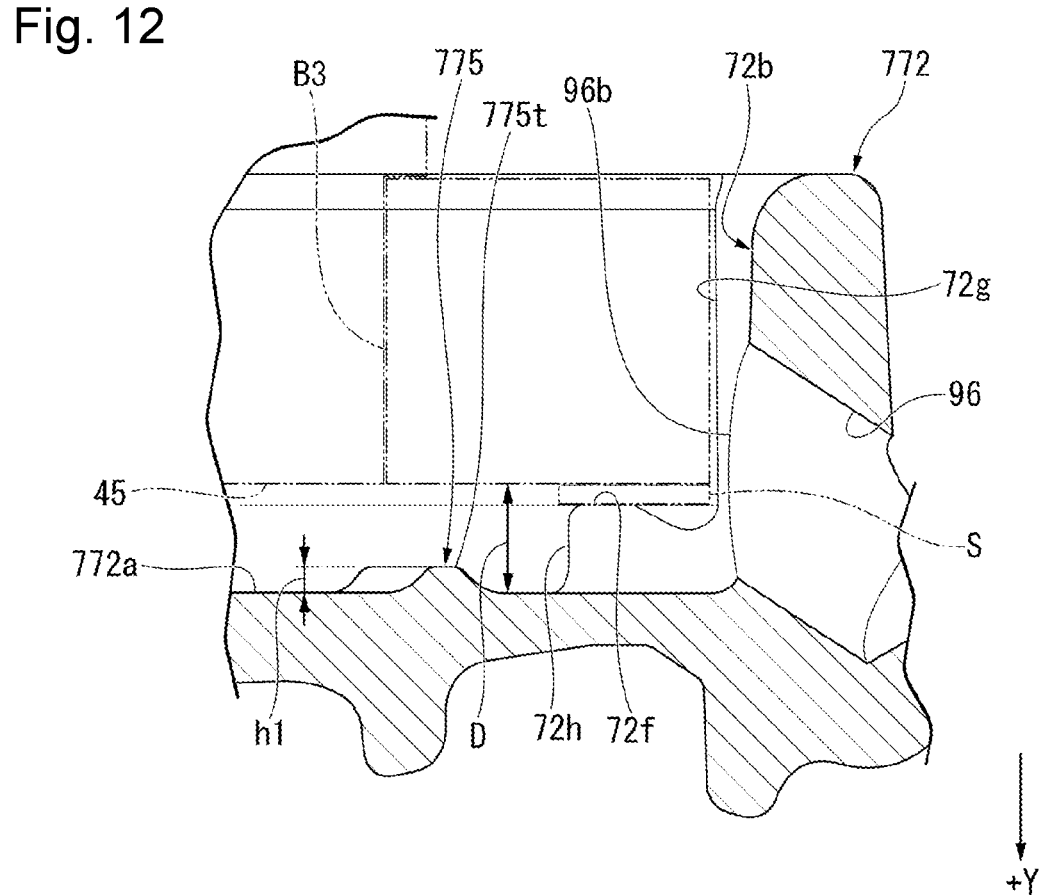
FIG. 12 is a schematic cross-sectional view of the second bearing holding portion taken along line XII-XII in FIG. 11.

FIG. 11 is a schematic view of a second bearing holding portion 772 of a seventh modification. FIG. 12 is a schematic cross-sectional view of the second bearing holding portion 772 taken along line XII-XII in FIG. 11.

As illustrated in FIG. 11, the second bearing holding portion 772 of the present modification has a second facing surface 772a and a second inner side surface 72b similarly to the above-described embodiment. The second facing surface 772a faces the other side (−Y side) in the axial direction. The second facing surface 772a is provided with a recess 77. As illustrated in FIG. 12, the second inner side surface 72b surrounds and supports the second bearing B3 from the radially outer side. As illustrated in FIG. 11, the second inner side surface 72b is provided with a wall 76. A first opening 97a, a second opening 98a, and a third opening 96b are open in the second inner side surface 72b. The wall 76 is positioned between the first opening 97a and the second opening 98a.

Similarly to the above-described embodiment, the second inner side surface 72b includes a stepped surface 72f facing the other side (−Y side) in the axial direction, a large diameter portion 72g positioned on the other side in the axial direction with respect to the stepped surface 72f, and a small diameter portion 72h positioned on one side in the axial direction with respect to the stepped surface 72f. The stepped surface 72f supports the shim S and the second bearing B3 from one side (+Y side) in the axial direction.

As illustrated in FIG. 11, the second inner side surface 72b is provided with a second concave portion 772k, and a third concave portion 772m. The second concave portion 772k and the third concave portion 772m are recessed radially outside from the small diameter portion 72h. In the present modification, the second opening 98a is opened in the third concave portion 772m. The third opening 96b opens in the second concave portion 772k.

The first opening 97a and the second opening 98a are provided in a region below (−X side) the second axis J2 on the second inner side surface 72b. The third opening 96b is provided in a region on one side (+X side) in the first direction with respect to the second axis J2 on the second inner side surface 72b. The first opening 97a and the third opening 96b are positioned on one side (+X side) in the first direction with respect to the second opening 98a.

In the second bearing holding portion 772 of the present modification, a rib 775 is provided on the second facing surface 772a. The rib 775 protrudes from the second facing surface 772a to the other side (−Y side) in the axial direction. The rib 775 extends along the up-down direction. The rib 775 of the present modification is positioned on one side (+X side) in the first direction with respect to the second axis J2, and extends in an arc shape centered on the second axis J2. In other words, the rib 775 has a shape protruding toward one side (+X side) in the first direction. The upper end portion and the lower end portion of the rib 775 of the present modification are arranged with a gap from the second inner side surface 72b. However, one or both end portions of the rib 775 may be connected to the second inner side surface 72b. The lower end portion of the rib 775 may be connected to the wall 76, for example. The rib 775 is not limited to an arc shape, and may have a linear shape, a V-shape, or the like. The rib 775 may have a shape recessed toward one side (+X side) in the first direction. A plurality of ribs 775 may be provided. The plurality of ribs 775 may be arranged side by side in at least one of the up-down direction and the first direction.

The rib 775 faces the third opening 96b in the first direction (X-axis direction). An upper end portion 775a of the rib 775 of the present modification is positioned below the upper end of the third opening 96b. The lower end portion 775b of the rib 775 of the present modification is positioned below the third opening 96b. That is, the rib 775 covers at least a part of the third opening 96b. The upper end portion 775a of the rib 775 may be positioned above the upper end of the third opening 96b. The lower end portion 775b of the rib 775 may be positioned above the third opening 96b.

The upper end portion 775a of the rib 775 of the present modification overlaps the first opening 97a in the up-down direction. The lower end portion 775b of the rib 775 of the present modification is positioned on one side (+X side) in the first direction with respect to the first opening 97a. Furthermore, the entire rib 775 of the present modification is positioned on one side (+X side) in the first direction with respect to the second opening 98a. That is, at least a part of the rib 775 is positioned on one side (+X side) in the first direction with respect to the first opening 97a and the second opening 98a.

According to the present modification, the rib 775 covers at least a part of the third opening 96b. Therefore, a part of the fluid O flowing into the second bearing holding portion 772 from the third opening 96b hits the rib 775. A part of the fluid O that has hit the rib 775 flows downward along the surface of the rib 775, and flows downward from the lower end portion 775b of the rib 775 along the second facing surface 772a.

According to the present modification, at least a part of the rib 775 is positioned on one side (+X side) in the first direction with respect to the first opening 97a and the second opening 98a. Therefore, the fluid O flowing downward from the rib 775 reaches the second inner side surface 72b on one side (+X side) in the first direction with respect to the first opening 97a and the second opening 98a. The fluid that has reached the second inner side surface 72b flows to the other side (−X side) in the first direction along the second inner side surface 72b. Since the first opening 97a is positioned on one side (+X side) in the first direction with respect to the second opening 98a, the fluid O is more likely to be preferentially supplied to the first opening 97a than to the second opening 98a.

In the present modification, the fluid O flowing through the supply flow path portion 96 connected to the third opening 96b is pumped by the pump 8 and reaches the second bearing holding portion 772 via the second supply pipe 94A, similarly to the above-described embodiment illustrated in FIG. 1. Therefore, the fluid O may vigorously flow into the second bearing holding portion 772 from the third opening 96b. When the rib 775 as in the present modification is not provided on the second facing surface 772a, the fluid O vigorously flowing into the second bearing holding portion 772 may pass through at least the upper side of the first opening 97a and reach the second inner side surface 72b on the other side (−X side) in the first direction with respect to the first opening 97a. Therefore, when the rib 775 is not provided, while the fluid O is supplied to the second opening 98a, the supply amount of the fluid O to the first opening 97a may be insufficient. According to the present modification, the rib 775 is provided in the path of the fluid O flowing into the second bearing holding portion 772, so that the flow of the fluid O can be directed to the first opening 97a. As a result, even when the force of the fluid O flowing into the second bearing holding portion 772 from the third opening 96b is strong, the fluid O can be sufficiently supplied to the first opening 97a.

As illustrated in FIG. 11, the rib 775 of the present modification extends toward the recess 77. The lower end portion 775b of the rib 775 of the present modification is positioned immediately above the recess 77. According to the present modification, the fluid O having hit the rib 775 is easily guided to the recess 77. As a result, the fluid O flowing into the second bearing holding portion 772 is easily stored in the recess 77. As a result, it is possible to suppress the fluid O from flowing out from the inside of the second bearing holding portion 772 to the outside. In addition, the first flow path portion 97 of the present modification is connected to the recess 77 via the first opening 97a, and the second flow path portion 98 is connected to the recess 77 via the second opening 98a, so that the fluid O stored in the recess 77 can easily flow into the first flow path portion 97 and the second flow path portion 98. The rib 775 may be provided inside the recess 77.

As illustrated in FIG. 12, a distal end 775t of the rib 775 in the protruding direction (axial direction) faces the second bearing B3 in the axial direction. Of the fluid O flowing into the second bearing holding portion 772 from the third opening 96*b*, another part that does not hit the rib 775 passes through the gap between the distal end 775*t* of the rib 775 and the second bearing holding portion 772. The fluid O passing through the gap between the distal end 775*t* and the second bearing holding portion 772 reaches the second inner side surface 72*b* on the other side (–X side) in the first direction with respect to the second opening 98*a*, and is supplied to the second opening 98*a*.

According to the present modification, by appropriately setting a protrusion height h1 of the rib 775, it is possible to prevent the fluid O from concentratedly flowing into only the first opening 97*a* and to appropriately flow the fluid O into the second opening 98*a*. In the present modification, the protrusion height h1 of the rib 775 is preferably half or less of a distance D from the second facing surface 772*a* to the end surface on one side (+Y side) in the axial direction of the second bearing B3. However, the protrusion height h1 of the rib 775 may be larger than half of the distance D from the second facing surface 772*a* to the end surface on one side (+Y side) in the axial direction of the second bearing B3. Here, the protrusion height h1 of the rib 775 is a distance in the axial direction between the second facing surface 772*a* and the distal end 775*t* of the rib 775.

Although the embodiment of the present invention and the modification thereof have been described above, the respective configurations and combinations thereof in the embodiment and the modification are merely examples, and therefore addition, omission, substation and other variations of the configurations can be made within the scope not departing from the gist of the present invention. Also note that the present invention is not limited by the embodiment.

For example, in the above-described embodiment and the modifications thereof, the rib-shaped wall extending linearly when viewed from the axial direction has been exemplified, but the shape of the rib is not limited thereto. Furthermore, in the above-described embodiment and the modifications thereof, the wall protruding from the facing surface integrally with the inner side surface has been exemplified, but the wall and the housing may be separate members. One or a plurality of walls may be provided. A plurality of the walls may be arranged side by side in the axial direction. In addition, the outer side surface of the wall desirably has a shape including a curved surface.

Further, in the above-described embodiment, the case where the first cylindrical portion, the second cylindrical portion, and the third cylindrical portion are provided integrally with the side wall has been described, but these may be configured by separate members fixed to the side wall. Each of the first cylindrical portion, the second cylindrical portion, and the third cylindrical portion may include a plurality of members. For example, the first facing surface and the first inner side surface may be parts of different members, and the second facing surface and the second inner side surface may be parts of different members.

In the above-described embodiment, the case where the first opening, the second opening, and the third opening are open to the inner side surface of the second bearing holding portion has been described. However, the first opening, the second opening, and the third opening may be open to another portion (for example, a facing surface) as long as the fluid can be guided to the inside of the second bearing holding portion.

In the above-described embodiment, the case where the first bearing holding portion, the second bearing holding portion, and the third bearing holding portion are provided on the side wall located on one side in the axial direction of the motor chamber has been described. However, the side wall provided with the first bearing holding portion, the second bearing holding portion, and the third bearing holding portion may be a partition wall that partitions the gear chamber and the motor chamber.

The configuration of each axis of the transmission mechanism of the above-described embodiment is an example. The number of shafts constituting the transmission mechanism is not limited to three. Two of the plurality of shafts may be coaxially arranged such that one passes through the other hollow portion. The fluid O stored in the housing 6 is not particularly limited, and may be a fluid other than oil. The fluid supplied to the motor by the fluid feed portion may be, for example, water.

Note that the present technique can have the following configurations. (1) A drive device including: a motor; a transmission mechanism configured to transmit power of the motor; a housing provided with a gear chamber that accommodates the transmission mechanism; and a flow path at least a part of which is provided in the housing and through which a fluid can flow, in which the transmission mechanism includes: a first shaft rotatable about a first axis extending in an axial direction; a second shaft rotatable about a second axis extending in parallel with the first axis; a third shaft rotatable about a third axis extending in parallel with the first axis and the second axis; a first bearing that supports the first shaft; a second bearing that supports the second shaft; and a third bearing that supports the third shaft, the housing includes: a side wall covering the gear chamber from one side in the axial direction; a first bearing holding portion that is provided in the side wall and holds the first bearing; a second bearing holding portion that is provided in the side wall and holds the second bearing; and a third bearing holding portion that is provided in the side wall and holds the third bearing, and the flow path includes: a supply flow path portion that supplies the fluid to an inside of the second bearing holding portion; a first flow path portion connecting an inside of the second bearing holding portion and an inside of the first bearing holding portion; and a second flow path portion connecting an inside of the second bearing holding portion and an inside of the third bearing holding portion. (2) The drive device according to (1), in which the second bearing holding portion includes: a facing surface positioned on one side in an axial direction with respect to an end portion on one side in an axial direction of the second shaft and extending in a direction orthogonal to the axial direction; and an inner side surface that extends in the axial direction and supports the second bearing from radially outside, and the inner side surface is provided with: a first opening that is an end portion of the first flow path portion; a second opening that is an end portion of the second flow path portion; and a wall that is positioned between the first opening and the second opening and protrudes radially inward. (3) The drive device according to (2), in which the inner side surface is provided with a third opening that is an end portion of the supply flow path portion, a direction intersecting both an up-down direction and the axial direction is defined as a first direction, and the first opening is positioned on one side in a first direction with respect to the wall, the second opening is positioned on an other side in the first direction with respect to the wall, and the third opening is positioned on one side in the first direction with respect to the wall. (4) The drive device according to (2), in which the inner side surface is provided with a third opening that is an end portion of the supply flow path portion, a direction intersecting both an up-down direction and the axial direction is defined as a first direction, and the first opening is positioned on one side in a first direction with respect to the wall, the second opening is positioned on an other side in the first direction with respect to the wall, and the third opening is positioned on an other side in the first direction with respect to the wall. (5) The drive device according to any one of (1) to (4), in which a cross-sectional area of the first flow path portion is larger than a cross-sectional area of the second flow path portion. (6) The drive device according to any one of (1) to (4), in which a cross-sectional area of the second flow path portion is larger than a cross-sectional area of the first flow path portion. (7) The drive device according to any one of (3) to (6), in which the transmission mechanism includes a differential device including the third shaft. (8) The drive device according to any one of (1) to (7), in which the second bearing holding portion has a facing surface positioned on one side in the axial direction with respect to the end portion on one side in the axial direction of the second shaft and extending in the direction orthogonal to the axial direction, the facing surface is provided with a recess recessed to one side in the axial direction, and the first flow path portion and the second flow path portion are connected to an inside of the recess. (9) The drive device according to (8), in which the second bearing holding portion has an inner side surface extending in the axial direction and supporting the second bearing from a radially outer side, the inner side surface is provided with: a first opening that is an end portion of the first flow path portion; a second opening that is an end portion of the second flow path portion; a wall that is positioned between the first opening and the second opening and protrudes radially inward, and the wall extends to an inside of the recess and is disposed on a side of the second opening with respect to a circumferential center of the recess.

(10) The drive device according to (8), in which the second bearing holding portion has an inner side surface extending from the facing surface to an other side in the axial direction and supporting the second bearing from a radially outer side, the inner side surface is provided with: a first opening that is an end portion of the first flow path portion; a second opening that is an end portion of the second flow path portion; a wall that is positioned between the first opening and the second opening and protrudes radially inward, and the wall extends to an inside of the recess and is disposed on a side of the first opening with respect to a circumferential center of the recess. (11) The drive device according to any one of (1) to (10), in which the second bearing holding portion includes: a facing surface positioned on one side in the axial direction with respect to an end portion on one side in the axial direction of the second shaft and extending in a direction orthogonal to the axial direction; and an inner side surface that extends in the axial direction and supports the second bearing from radially outside, the inner side surface is provided with: a first opening that is an end portion of the first flow path portion; a second opening that is an end portion of the second flow path portion; and a third opening that is an end portion of the supply flow path portion, the facing surface is provided with a rib that protrudes to an other side in an axial direction and covers at least a part of the third opening, a direction intersecting both an up-down direction and an axial direction is defined as a first direction, the first opening and the second opening are positioned on one side in the first direction with respect to the second opening, and at least a part of the rib is provided on one side in the first direction with respect to the second opening. (12) The drive device according to (11), in which the facing surface is provided with a recess recessed to one side in an axial direction, and the rib extends toward the recess.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device comprising:
a motor;
a transmission mechanism configured to transmit power of the motor;
a housing provided with a gear chamber that accommodates the transmission mechanism; and
a flow path at least a part of which is provided in the housing and through which a fluid can flow, wherein
the transmission mechanism includes:
  a first shaft rotatable about a first axis extending in an axial direction;
  a second shaft rotatable about a second axis extending in parallel with the first axis;
  a third shaft rotatable about a third axis extending in parallel with the first axis and the second axis;
  a first bearing that supports the first shaft;
  a second bearing that supports the second shaft; and
  a third bearing that supports the third shaft,
the housing includes:
  a side wall covering the gear chamber from one side in the axial direction;
  a first bearing holding portion that is provided in the side wall and holds the first bearing;
  a second bearing holding portion that is provided in the side wall and holds the second bearing; and
  a third bearing holding portion that is provided in the side wall and holds the third bearing, and
the flow path includes:
  a supply flow path portion that supplies the fluid to an inside of the second bearing holding portion;
  a first flow path portion connecting the inside of the second bearing holding portion and an inside of the first bearing holding portion; and
  a second flow path portion connecting the inside of the second bearing holding portion and an inside of the third bearing holding portion.

2. The drive device according to claim 1, wherein
the second bearing holding portion includes:
  a facing surface positioned on one side in an axial direction with respect to an end portion on one side in the axial direction of the second shaft and extending in a direction orthogonal to the axial direction; and
  an inner side surface that extends in the axial direction and supports the second bearing from radially outside, and
the inner side surface is provided with:
  a first opening that is an end portion of the first flow path portion;
  a second opening that is an end portion of the second flow path portion; and
  a wall that is positioned between the first opening and the second opening and protrudes radially inward.

3. The drive device according to claim 2, wherein
the inner side surface is provided with a third opening that is an end portion of the supply flow path portion, a direction intersecting both an up-down direction and the axial direction is defined as a first direction, the first opening is positioned on one side in a first direction with respect to the wall, the second opening is positioned on an other side in the first direction with respect to the wall, and the third opening is positioned on one side in the first direction with respect to the wall.

4. The drive device according to claim 3, wherein the transmission mechanism includes a differential device including the third shaft.

5. The drive device according to claim 2, wherein the inner side surface is provided with a third opening that is an end portion of the supply flow path portion, a direction intersecting both an up-down direction and the axial direction is defined as a first direction, the first opening is positioned on one side in a first direction with respect to the wall, the second opening is positioned on an other side in the first direction with respect to the wall, and the third opening is positioned on the other side in the first direction with respect to the wall.

6. The drive device according to claim 1, wherein a cross-sectional area of the first flow path portion is larger than a cross-sectional area of the second flow path portion.

7. The drive device according to claim 1, wherein a cross-sectional area of the second flow path portion is larger than a cross-sectional area of the first flow path portion.

8. The drive device according to claim 1, wherein the second bearing holding portion has a facing surface located on one side in the axial direction with respect to the end portion on one side in the axial direction of the second shaft and extending in the direction orthogonal to the axial direction, the facing surface is provided with a recess recessed to one side in the axial direction, and the first flow path portion and the second flow path portion are connected to an inside of the recess.

9. The drive device according to claim 8, wherein the second bearing holding portion has an inner side surface extending in the axial direction and supporting the second bearing from a radially outer side, and the inner side surface is provided with:

the first opening that is the end portion of the first flow path portion;

the second opening that is the end portion of the second flow path portion;

the wall that is positioned between the first opening and the second opening and protrudes radially inward, and the wall extends to an inside of the recess and is disposed on a side of the second opening with respect to a circumferential center of the recess.

10. The drive device according to claim 8, wherein the second bearing holding portion has an inner side surface extending from the facing surface to an other side in the axial direction and supporting the second bearing from a radially outer side, the inner side surface is provided with:

the first opening that is the end portion of the first flow path portion;

the second opening that is the end portion of the second flow path portion; and the wall that is positioned between the first opening and the second opening and protrudes radially inward, and the wall extends to the inside of the recess and is disposed on a side of the first opening with respect to a circumferential center of the recess.

11. The drive device according to claim 1, wherein the second bearing holding portion includes:

a facing surface positioned on one side in the axial direction with respect to an end portion on one side in the axial direction of the second shaft and extending in a direction orthogonal to the axial direction; and an inner side surface that extends in the axial direction and supports the second bearing from radially outside, the inner side surface is provided with:

a first opening that is an end portion of the first flow path portion;

a second opening that is an end portion of the second flow path portion; and a third opening that is an end portion of the supply flow path portion, the facing surface is provided with a rib that protrudes to an other side in an axial direction and covers at least a part of the third opening, a direction intersecting both an up-down direction and an axial direction is defined as a first direction, the first opening and the second opening are positioned on one side in the first direction with respect to the second opening, and at least a part of the rib is provided on one side in the first direction with respect to the second opening.

12. The drive device according to claim 11, wherein the facing surface is provided with a recess recessed to one side in the axial direction, and the rib extends toward the recess.

* * * * *